US009916001B2

(12) United States Patent
Thurman et al.

(10) Patent No.: US 9,916,001 B2
(45) Date of Patent: Mar. 13, 2018

(54) SPORT EQUIPMENT INPUT MODE CONTROL

(71) Applicant: Wilson Sporting Goods Co., Chicago, IL (US)

(72) Inventors: Robert T. Thurman, Plainfield, IL (US); Thomas Gruger, Evanston, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 478 days.

(21) Appl. No.: 14/325,917

(22) Filed: Jul. 8, 2014

(65) Prior Publication Data

US 2016/0008660 A1 Jan. 14, 2016

(51) Int. Cl.
G06F 19/00 (2011.01)
G06F 3/01 (2006.01)
G06F 1/16 (2006.01)
A63B 69/00 (2006.01)
A63F 9/24 (2006.01)

(52) U.S. Cl.
CPC ............ *G06F 3/011* (2013.01); *G06F 1/1694* (2013.01); *A63B 69/002* (2013.01); *A63B 2220/44* (2013.01); *A63B 2220/833* (2013.01); *A63B 2225/50* (2013.01); *A63B 2243/0025* (2013.01); *A63B 2243/0037* (2013.01); *A63F 2009/2447* (2013.01)

(58) Field of Classification Search
CPC .......... A63B 2220/833; A63B 2225/50; A63B 2220/34; A63B 2220/40; A63B 2220/44; A63B 24/0021; A63B 2243/0037; A63F 13/005; A63F 13/812; G06Q 10/0639; G09B 19/0038; G06F 1/3206
See application file for complete search history.

(56) References Cited

U.S. PATENT DOCUMENTS

| | | |
|---|---|---|
| 2,020,484 A | 11/1935 | Turner |
| 2,307,362 A | 1/1943 | Dupler |
| 2,849,819 A | 9/1958 | Murphy et al. |
| 2,871,343 A | 1/1959 | Whitney |
| 2,903,820 A | 9/1959 | Bodell |
| 3,011,048 A | 11/1961 | O'Brien |
| 3,229,976 A | 1/1966 | Allen, Jr. |
| 3,304,651 A | 2/1967 | Deyerl |
| 3,351,347 A | 11/1967 | Smith et al. |
| 3,458,205 A | 7/1969 | Smith et al. |
| 3,521,886 A | 7/1970 | Bosco |
| 3,580,575 A | 5/1971 | Speeth |
| 3,610,916 A | 10/1971 | Meehan |

(Continued)

*Primary Examiner* — Justin Myhr
(74) *Attorney, Agent, or Firm* — Terence P. O'Brien; Todd A. Rathe

(57) ABSTRACT

An apparatus comprises a sensor to be carried by a piece of sporting equipment and a non-transitory computer-readable medium containing program logic that operates different operational modes. The program logic receives signals from the sensor, determines from the signals whether the piece of sporting equipment is in a sport action state or a mode input state, records a sport action result in response to determination that the piece of sporting equipment is in a sport action state, and switches the program logic to a different operational mode in response to determination that the piece of sporting equipment is in a mode input state.

26 Claims, 9 Drawing Sheets

(56) References Cited

U.S. PATENT DOCUMENTS

| | | |
|---|---|---|
| 3,745,677 A | 7/1973 | Moran |
| 3,786,246 A | 1/1974 | Johnson et al. |
| 3,804,411 A | 4/1974 | Hendry |
| 3,935,669 A | 2/1976 | Potrzuski et al. |
| 4,002,893 A | 1/1977 | Newcomb et al. |
| 4,133,528 A | 1/1979 | Koblick |
| 4,479,649 A | 10/1984 | Newcomb et al. |
| 4,542,445 A | 9/1985 | Marletta |
| 4,563,160 A | 1/1986 | Lee |
| 4,607,850 A | 8/1986 | O'Riley |
| 4,701,146 A | 10/1987 | Swenson |
| 4,776,589 A | 10/1988 | Yang |
| 4,801,141 A | 1/1989 | Rumsey |
| 4,904,981 A | 2/1990 | Mele et al. |
| 4,963,117 A | 10/1990 | Gualdoni |
| 4,967,596 A | 11/1990 | Rilling et al. |
| 4,997,403 A | 3/1991 | Akman |
| 4,999,603 A | 3/1991 | Mele et al. |
| 5,039,977 A | 8/1991 | Mele et al. |
| 5,054,778 A | 10/1991 | Maleyko |
| 5,066,011 A | 11/1991 | Dykstra et al. |
| 5,066,012 A | 11/1991 | Stark |
| 5,071,122 A | 12/1991 | Messina |
| 5,080,359 A | 1/1992 | Thill |
| 5,102,131 A | 4/1992 | Remington et al. |
| 5,170,664 A | 12/1992 | Hirsh et al. |
| 5,186,458 A | 2/1993 | Redondo |
| 5,228,686 A | 7/1993 | Maleyko |
| 5,236,383 A | 8/1993 | Connelly |
| 5,319,531 A | 6/1994 | Kutnyak |
| 5,388,825 A | 2/1995 | Myers et al. |
| 5,403,000 A | 4/1995 | Woosley |
| 5,564,702 A | 10/1996 | Meffert |
| 5,609,411 A | 3/1997 | Wang |
| 5,639,076 A | 6/1997 | Cmiel et al. |
| 5,683,316 A | 11/1997 | Campbell |
| 5,694,340 A | 12/1997 | Kim |
| 5,725,445 A | 3/1998 | Kennedy et al. |
| 5,820,484 A | 10/1998 | Terry |
| 5,882,204 A | 3/1999 | Iannazo et al. |
| 5,888,156 A | 3/1999 | Gmiel et al. |
| 6,073,086 A | 6/2000 | Marinelli |
| 6,142,894 A | 11/2000 | Lee |
| 6,148,271 A | 11/2000 | Marinelli |
| 6,151,563 A | 11/2000 | Marinelli |
| 6,157,898 A | 12/2000 | Marinelli |
| 6,224,493 B1 | 5/2001 | Lee et al. |
| 6,251,035 B1 | 6/2001 | Fa |
| 6,389,368 B1 | 5/2002 | Hampton |
| 6,428,432 B1 | 8/2002 | Kachel |
| 6,482,071 B1 | 11/2002 | Wilgosz |
| 6,547,623 B1 | 4/2003 | Collado |
| 6,572,492 B2 | 6/2003 | Tinsman |
| 6,726,580 B2 | 4/2004 | Peterson |
| 6,780,130 B1 | 8/2004 | Monochello |
| 7,014,581 B2 | 3/2006 | Ng |
| 7,021,140 B2 | 4/2006 | Perkins |
| 7,140,248 B1 | 11/2006 | Brundage |
| 7,148,583 B1 | 12/2006 | Shau et al. |
| 7,179,181 B2 | 2/2007 | Ko |
| 7,234,351 B2 | 6/2007 | Perkins |
| 7,288,037 B2 | 10/2007 | Myers |
| 7,719,469 B2 | 5/2010 | Englert et al. |
| 7,727,097 B2 | 6/2010 | Siegel et al. |
| 7,740,551 B2 | 6/2010 | Nurnberg et al. |
| 7,795,861 B2 | 9/2010 | Englert et al. |
| 7,811,163 B2 | 10/2010 | Ratcliffe |
| 7,867,115 B2 | 1/2011 | Zawitz |
| 7,891,666 B2 | 2/2011 | Kuenzler et al. |
| 7,915,887 B2 | 3/2011 | Englert et al. |
| 7,927,253 B2 | 4/2011 | Vincent et al. |
| 8,010,105 B2 | 8/2011 | Buckley et al. |
| 8,036,826 B2 | 10/2011 | MacIntosh et al. |
| 8,057,328 B2 | 11/2011 | Englert |
| 8,070,620 B2 | 12/2011 | Rankin |
| 8,079,925 B2 | 12/2011 | Englert et al. |
| 8,172,722 B2 | 5/2012 | Molyneux et al. |
| 8,221,290 B2 | 7/2012 | Vincent et al. |
| 8,228,056 B2 | 7/2012 | Bucher |
| 8,231,487 B2 | 7/2012 | Nurnberg et al. |
| 8,231,506 B2 | 7/2012 | Molyneux et al. |
| 8,340,740 B2 | 12/2012 | Holzer et al. |
| 8,353,791 B2 | 1/2013 | Holthouse et al. |
| 8,439,773 B2 | 5/2013 | Silagy |
| 8,506,430 B2 | 8/2013 | Von Der Gruen et al. |
| 8,512,177 B2 | 8/2013 | Krysiak et al. |
| 8,517,870 B2 | 8/2013 | Crowley et al. |
| 8,535,185 B2 | 9/2013 | Englert |
| 8,562,487 B2 | 10/2013 | Berggren et al. |
| 8,579,632 B2 | 11/2013 | Crowley |
| 8,597,095 B2 | 12/2013 | Crowley et al. |
| 8,617,008 B2 | 12/2013 | Marty et al. |
| 8,622,832 B2 | 1/2014 | Marty et al. |
| 8,678,897 B2 | 3/2014 | Englert et al. |
| 8,725,452 B2 | 5/2014 | Han |
| 8,758,172 B2 | 6/2014 | Creuger |
| 8,781,610 B2 | 7/2014 | Han |
| 8,903,521 B2 | 12/2014 | Goree et al. |
| 8,905,855 B2 | 12/2014 | Fitzpatrick et al. |
| 8,941,723 B2 | 1/2015 | Bentley et al. |
| 8,944,928 B2 | 2/2015 | Kaps et al. |
| 8,944,939 B2 | 2/2015 | Clark et al. |
| 8,951,106 B2 | 2/2015 | Crowley et al. |
| 8,989,441 B2 | 3/2015 | Han et al. |
| 9,283,457 B2 | 3/2016 | Thurman et al. |
| 9,339,710 B2 | 5/2016 | Thurman et al. |
| 9,492,724 B2 | 11/2016 | Thurman et al. |
| 9,517,397 B2 | 12/2016 | Thurman et al. |
| 9,623,311 B2 | 4/2017 | Thurman et al. |
| 9,656,140 B2 | 5/2017 | Thurman et al. |
| 9,656,142 B2 | 5/2017 | Thurman et al. |
| 9,656,143 B2 | 5/2017 | Thurman et al. |
| 9,724,570 B2 | 8/2017 | Krysiak et al. |
| 2002/0123386 A1 | 9/2002 | Perlmutter |
| 2002/0137582 A1 | 9/2002 | Yu |
| 2003/0054905 A1 | 3/2003 | King, Jr. |
| 2003/0073518 A1 | 4/2003 | Marty et al. |
| 2003/0224885 A1 | 12/2003 | Leal et al. |
| 2005/0288133 A1 | 12/2005 | Rudell |
| 2005/0288134 A1 | 12/2005 | Smith |
| 2007/0026974 A1 | 2/2007 | Marty et al. |
| 2007/0026975 A1 | 2/2007 | Marty et al. |
| 2007/0074752 A1 | 4/2007 | Shau et al. |
| 2007/0167266 A1 | 7/2007 | Devall |
| 2007/0281811 A1 | 12/2007 | Wang |
| 2008/0088303 A1 | 4/2008 | Englert |
| 2008/0174281 A1 | 7/2008 | Shau |
| 2008/0254866 A1 | 10/2008 | Young et al. |
| 2008/0312010 A1 | 12/2008 | Marty et al. |
| 2009/0029754 A1 | 1/2009 | Slocum et al. |
| 2009/0040761 A1 | 2/2009 | Huang et al. |
| 2009/0062033 A1 | 3/2009 | Harada |
| 2009/0111616 A1 | 4/2009 | Creelman |
| 2009/0191990 A1 | 7/2009 | Smith |
| 2009/0210078 A1 | 8/2009 | Crowley |
| 2009/0325739 A1 | 12/2009 | Gold |
| 2010/0035710 A1 | 2/2010 | Smith |
| 2010/0036753 A1 | 2/2010 | Harvill et al. |
| 2010/0069181 A1 | 3/2010 | Lin |
| 2010/0130315 A1 | 5/2010 | Steidle |
| 2010/0184563 A1 | 7/2010 | Molyneux et al. |
| 2010/0198043 A1 | 8/2010 | Holzer et al. |
| 2010/0261557 A1 | 10/2010 | Joseph et al. |
| 2011/0013087 A1 | 1/2011 | House et al. |
| 2011/0118062 A1* | 5/2011 | Krysiak ............ A63B 41/02 473/570 |
| 2011/0118064 A1 | 5/2011 | Krysiak et al. |
| 2011/0118065 A1 | 5/2011 | Krysiak et al. |
| 2011/0119022 A1 | 5/2011 | Kuenzler et al. |
| 2011/0136603 A1 | 6/2011 | Lin et al. |
| 2011/0212798 A1 | 9/2011 | Zawitz |
| 2011/0269517 A1 | 11/2011 | Englert et al. |
| 2011/0304497 A1 | 12/2011 | Molyneux et al. |
| 2011/0316529 A1 | 12/2011 | Stancil et al. |

(56) References Cited

U.S. PATENT DOCUMENTS

| | | |
|---|---|---|
| 2012/0029666 A1* | 2/2012 | Crowley .......... A63B 24/0062 700/91 |
| 2012/0040785 A1 | 2/2012 | DeSort |
| 2012/0058845 A1 | 3/2012 | Crowley et al. |
| 2012/0071282 A1 | 3/2012 | Smith |
| 2012/0139493 A1 | 6/2012 | Sakurai et al. |
| 2012/0212505 A1 | 8/2012 | Burroughs et al. |
| 2012/0244969 A1 | 9/2012 | Binder |
| 2012/0262329 A1 | 10/2012 | Molyneux |
| 2012/0277890 A1 | 11/2012 | Han |
| 2012/0278023 A1 | 11/2012 | Han |
| 2012/0322587 A1 | 12/2012 | Duke |
| 2013/0005512 A1 | 1/2013 | Joseph et al. |
| 2013/0023365 A1 | 1/2013 | Idoni-Matthews et al. |
| 2013/0068017 A1 | 3/2013 | Perkins et al. |
| 2013/0073247 A1 | 3/2013 | Perkins et al. |
| 2013/0073248 A1 | 3/2013 | Perkins et al. |
| 2013/0085006 A1 | 4/2013 | Nilwong et al. |
| 2013/0090750 A1 | 4/2013 | Herrman et al. |
| 2013/0130314 A1 | 5/2013 | Williamson et al. |
| 2013/0167290 A1 | 7/2013 | Ezra |
| 2013/0274040 A1 | 10/2013 | Coza et al. |
| 2013/0274635 A1 | 10/2013 | Coza et al. |
| 2014/0018181 A1 | 1/2014 | Blake et al. |
| 2014/0031151 A1 | 1/2014 | Crowley et al. |
| 2014/0039651 A1 | 2/2014 | Crowley |
| 2014/0081436 A1 | 3/2014 | Crowley et al. |
| 2014/0120960 A1* | 5/2014 | Hohteri .......... A63B 71/0605 455/466 |
| 2014/0125806 A1 | 5/2014 | Kemppainen et al. |
| 2014/0128182 A1 | 5/2014 | Hohteri |
| 2014/0195019 A1 | 7/2014 | Thurman et al. |
| 2014/0200103 A1 | 7/2014 | Thurman et al. |
| 2014/0200692 A1 | 7/2014 | Thurman et al. |
| 2014/0222177 A1 | 8/2014 | Thurman et al. |
| 2014/0228155 A1 | 8/2014 | Hohteri |
| 2014/0295874 A1 | 10/2014 | Hohteri et al. |
| 2014/0303759 A1 | 10/2014 | Hohteri |
| 2014/0342329 A1 | 11/2014 | Debendetto et al. |
| 2014/0375817 A1 | 12/2014 | Mescheter et al. |
| 2015/0011343 A1 | 1/2015 | Krysiak et al. |
| 2015/0112464 A1 | 4/2015 | Crowley et al. |
| 2015/0165294 A1 | 6/2015 | Wackerly |
| 2015/0382076 A1 | 12/2015 | Davisson et al. |
| 2016/0001136 A1* | 1/2016 | King .......... A63B 69/0071 320/108 |

* cited by examiner

| SIGNAL PATTERN | SPORT ACTION MOTION |
|---|---|
| 00001 | DRIBBLE |
| 00002 | BOUNCE PASS |
| 00003 | SHOT |
| 00004 | NET |
| 00005 | RIM IMPACT |
| 00006 | BACKBOARD IMPACT |
| ... | ... |

| MODE INPUTS | CURRENT MIA |
|---|---|
| NEW GAME | ORIENTATION A + TAP X |
| END GAME | ORIENTATION B + TAP X |
| NEW PRACT. | ORIENTATION A + TAP Y |
| END PRACT. | ORIENTATION B + TAP Y |
| CHANGE PRACT. | SPIN A |
| CHANGE DIFFICULTY | SPIN B |
| CORRECT RESULT | TAP Z |
| START TIMER | ORIENTATION A |
| STOP TIMER | ORIENTATION B |
| TIMEOUT | ORIENTATION C |
| FOUL/PENALTY | |
| ... | ... |

| SIGNAL PATTERN | SPORT ACTION MOTION |
|---|---|
| 00001 | SNAP |
| 00002 | DROP |
| 00003 | PASS RELEASE |
| 00004 | CATCH |
| 00005 | GROUND IMPACT |
| 00006 | PUNT |
| 00007 | KICK |
| 00008 | KICK HOLD |
| ... | ... |

SELECTED MODE INPUT  [CORRECT RESULT]
- SPIN
  - TIME
  - REVOLUTIONS
  - FREQUENCY
  - DIRECTION
- IMPACT/TAP
  - NUMBER
  - FORCE
  - LOCATION
  - ORIENTATION
  - MARKER
  - TIME
  - UP/DOWN/SIDEWAYS
- SENSING SURFACE
  - PATTERN
  - TIME
  - NUMBER

[DONE/SAVE]   [ADD]

| RESULT | | SPIN | HEIGHT | DISTANCE |
|---|---|---|---|---|
| SHOT 1 | MAKE | xxx | xxx | xxx |
| SHOT 2 | MISS | xxx | xxx | xxx |
| SHOT 3 | MAKE | xxx | xxx | xxx |
| SHOT 4 | MAKE | xxx | xxx | xxx |
| ... | | | | |

FIELD GOAL %   3-PT %
FREE THROW %   2-PT %

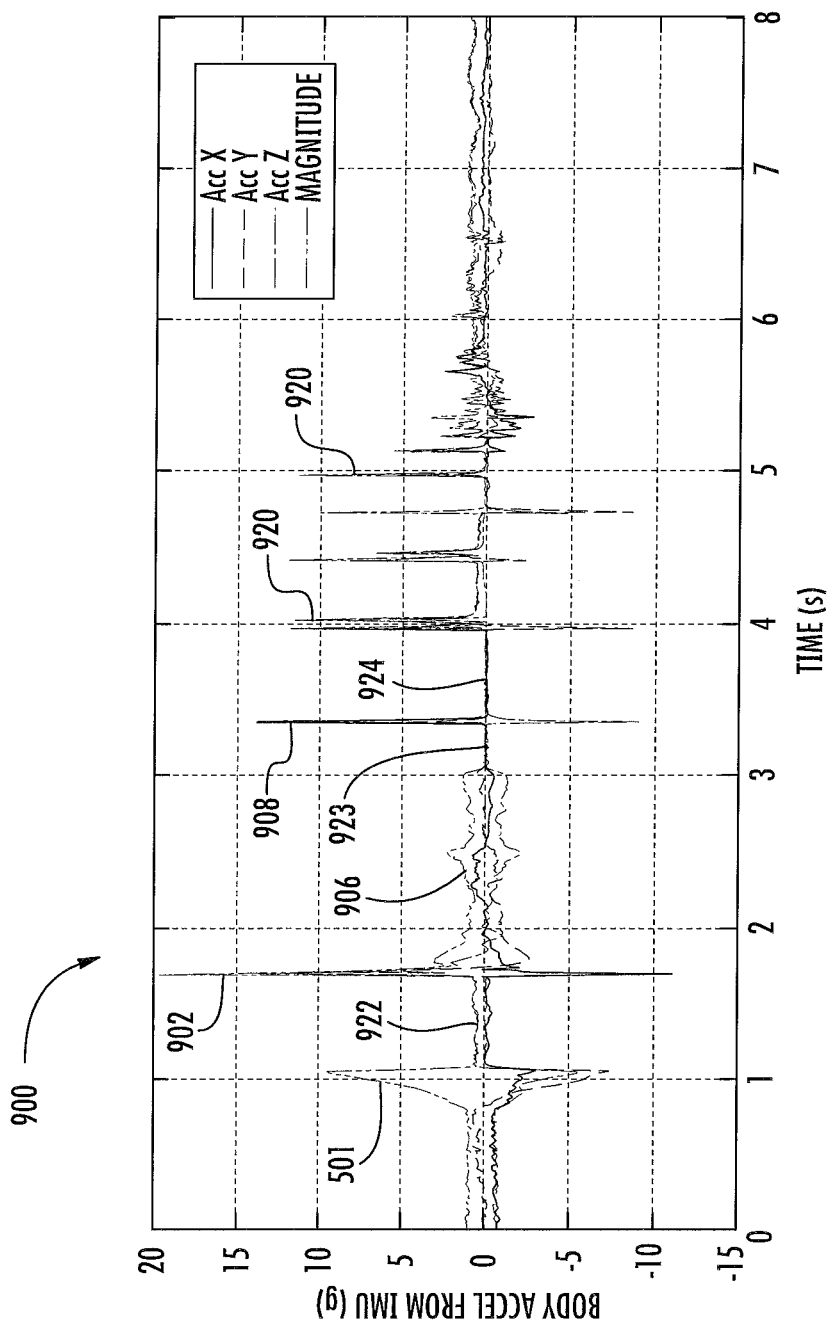

SPORT EQUIPMENT INPUT MODE CONTROL

BACKGROUND

Sporting activities are frequently observed, tracked and recorded. Such tracking generally requires either an observer to record the results of the sporting activities or requires the sporting activity participant to either remember his or her results for subsequent recordation or to continuously interrupt the sporting activity to record the results during the sporting activity.

BRIEF DESCRIPTION OF THE DRAWINGS

FIG. 5A is a diagram of an example mode input library for the sporting equipment input system of FIG. 3.

FIG. 6 is a diagram of an example sport action library for the sporting equipment input system of FIG. 4.

FIG. 8 is a diagram of another example sport action library for the sporting equipment input system of FIG. 4.

FIG. 11 is another graph illustrating example signal patterns for different example sport action motions of a football.

FIG. 12 is a diagram of an example screenshot presented by the system of FIG. 4, illustrating user selection of mode input actions for mode inputs.

FIG. 14 is a diagram of an example screenshot presented by the system of FIG. 4, illustrating the output of results by the system of FIG. 4.

DETAILED DESCRIPTION OF THE PREFERRED EMBODIMENTS

Figure 1:
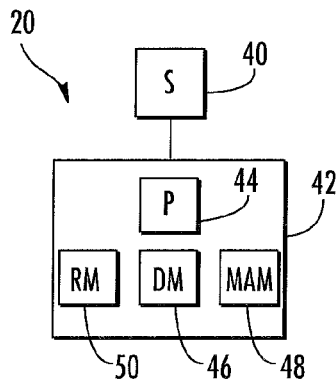
FIG. 1 is a schematic diagram of an example sport equipment input control system.

FIG. 1 schematically illustrates an example sport equipment input control system 20 for use with a piece of sporting equipment. Control system 20 facilitates electronic recording and tracking results of a sporting activity involving a piece of sporting equipment, wherein the same piece of sporting equipment is usable as an input device to change operational modes of the electronics with minimal interruption of the sporting activity. Control system 20 distinguishes between signals received from the piece of sporting equipment resulting from sport action motions and signals received from the piece of sporting equipment resulting from a mode input action. As a result, system 20 is able to record results of the sporting activity when appropriate and is also able to adjust operation of the electronic tracking and recording when desired.

Control system 20 comprises a kit or package of electronics for use with a piece of sporting equipment. In one implementation, the piece of sporting equipment comprises a regulation piece of sporting equipment: a regulation ball glove including a baseball glove, a softball glove, a baseball mitt and a softball mitt, a regulation baseball, a regulation softball, a regulation ball bat including a baseball bat and a softball bat, a regulation sports racquet including a tennis racquet, a badminton racquet, a squash racquet, a racquetball racquet and a paddle ball racquet, a regulation golf club, a regulation golf ball, a regulation basketball, a regulation American football, a regulation volleyball, a regulation soccer ball, a regulation hockey stick, a regulation hockey puck, and a regulation lacrosse stick. For purposes of this disclosure, the term "regulation" with respect to a piece of sporting equipment means that the sporting equipment is sized, shaped and configured for approved use in an officially sanctioned sporting activity such as, for example, a softball game, a baseball game, a tennis match, a badminton match, a squash match, a golf round, match or tournament, a basketball game, a football game, a soccer match, a volleyball game, a lacrosse game or a hockey game. For example, a regulation basketball may comprise a basketball approved for play in, or meeting the requirements of, a youth basketball organization, a high school association (e.g., the Illinois High School Association (IHSA)), the NCAA, the WNBA, the NBA or other sanctioning body, wherein the basketball has parameter characteristics satisfying predefined requirements, rules and/or regulations of such organizations. Likewise, a regulation football may comprise a football approved by a youth football organization such as Pop Warner, a high school Association, the NCAA, the NFL or other sanctioning body, wherein the football has parameter characteristics satisfying predefined requirements rules and/or regulations of such organizations. A regulation baseball or regulation baseball bat may comprise a baseball or bat approved by a youth baseball organization such as Little League or PONY league, a high school Association, the NCAA, Major League Baseball or other sanctioning body, wherein the baseball or bat has parameters or characteristics satisfying predefined requirements, rules and/or regulations of such organizations.

Control system 20 comprises sensor 40 and signal analysis electronics 42. Sensor 40 comprises one or more sensing elements mountable to, on or within the piece of sporting equipment, wherein the one or more sensing elements output signals based upon one or more characteristics of the piece of sporting equipment. In one implementation, signals from the same individual sensing elements are used to determine both sport action sporting event results as well as inputs for changing operational mode of the electronics 42. For example, in one implementation with respect to a regulation basketball, signals from an individual sensing element carried by the basketball are used to determine results of sport actions pertaining to the basketball such as the arc of a basketball shot, the spin of the basketball during a basketball shot, the distance of a basketball shot, an identification of whether a basketball shot is a layup, a dunk, a two point shot, a three-point shot or a free throw and whether a shot resulted in a made basket or a missed basket. Signals from the same individual sensing element carried by the basketball are also used to change an operational mode of electronics 42 such as: starting or ending a game managed or tracked by electronics 42; starting or ending a practice session managed or tracked by electronics 42; changing participants in a managed/tracked practice session or game; changing the type of game (e.g, 5 on 5, 3 on 3, 1 on 1, full court, half court, horse, etc.) or practice session to be initiated; adjusting a handicap or difficulty in such a managed or tracked game; adjusting the point(s) to be associated with a made basket; starting or stopping a timer; changing a monitored action (i.e., e.g., indicating that the practice portion is switching from three-point attempts to free throw attempts); tracking game statistics and/or information (e.g. number of fouls, etc.); and/or correcting a prior result (e.g, an incorrectly determined result or player determined result). In another implementation, sensor 40 comprises different sets of sensing elements, wherein a first set of the sensing elements output signals for recording and tracking results of a sporting action and wherein a second set of the sensing elements output signals for inputting commands or selections to change an operational mode.

In one implementation, sensor 40 comprises one or more of a pressure sensor, a motion sensor, a location sensor, an orientation sensor, a gripping sensor, a load sensor, or a light sensor. For example, sensor 40 may include one or more pressure sensing elements along an exterior surface or skin of the piece of sporting equipment such as along the outer covering of a ball or along a grip of a racquet, stick or club. The one or pressure sensing elements are alternatively or additionally located to detect air pressure changes within the bladder of a piece of sporting equipment comprising an inflated ball. Sensor 40 may include one or more motion sensing elements, such as one of more accelerometers, carried by the piece of sporting equipment. Sensor 40 may include one or more location sensors such as one or more global positioning system (GPS) or similar navigational positioning antennas, magnetometers would sense magnetic field or polar magnetic field to determine location or position of a piece of sporting equipment or the like. Sensor 40 may include orientation sensing element, such as one or more gyroscope elements, carried by the piece of sporting equipment, for detecting the spin and/or spin axis of the sporting equipment. Sensor 40 may include one or more light sensors such as one or more sensors along the skin or outer surface of the piece of sporting equipment, wherein such sensors output signals in response to being covered or blocked by a person's hand or portions of a person's hand gripping or covering the skin or handle. In one implementation, such light sensors facilitate determination of how a person is gripping a handle or grasping a ball as well as facilitating the input of commands or selections to changing operational mode.

Electronics 42 receives signals from sensor 40 and changes or switches an operational mode of an application or program based upon such signals. In one implementation, electronics 42 changes an operational mode or status of results module 50 based upon signals received from sensor 40 and determined by electronics 42 from mode input actions rather than sporting actions. In one implementation, electronics 42 distinguishes between received signals intended to serve as input for changing an operational mode of an application or program from received signals that are not the result of an intention to input a selection or command to changing operational mode, but are merely the result of regular use of the piece of sporting equipment undergoing a sport action motion. For purposes of this disclosure, a "sport action motion" is a motion or groups of motions of the piece of sporting equipment that naturally or inherently occur(s) during use of the equipment in competition. Each sport action motion can be identified by a characteristic range and/or pattern of one or more detectable parameters or values pertaining to the positioning, orientation, acceleration, velocity, impact, vibration and spin of the piece of sporting equipment, alone or in any combination, which can occur during use of the sporting equipment in competition or regulation play. For example, a sport action motion for a regulation basketball comprise those characteristic ranges and patterns of detectable parameters or values of the basketball that occur during a dribble of the basketball, a pass of the basketball, a shot of the basketball towards the basketball hoop (not simply tossing the ball in a vertical direction) and the like. Sport action motion for a regulation football comprises characteristic ranges and patterns of detectable parameters or values of the football that occur during a throw the football, a kick of the football, a punt of the football, a catch of the football, and a handoff or carry of the football and the like. Sport action motion for a regulation bat comprises characteristic ranges and patterns of detectable parameters or values of the ball bat that occur during different swings of the bat. Sport action motion for a regulation tennis racquet comprises characteristic ranges and patterns of detectable parameters or values of the racquet that occur during different swings of the racquet.

Electronics 42 distinguishes between signals resulting from a sport action motion of the equipment as compared to signals resulting from the equipment being manipulated in an unnatural manner that does not inherently occur during normal manipulation of the equipment during a game or match, such as, for example, the equipment being spun a certain way, being impacted a certain way, being maintained in a particular orientation for predetermined period of time, being tapped or impacted in a certain manner or the like, or a predetermined or predefined combination of two or more of such manipulations to input a command or selection to a computer application or program. In other words, electronics 42 looks for abnormal or predetermined regular signals or patterns of signals that generally cannot or do not accidentally occur during handling of the piece of sporting equipment or that do not naturally occur during use of the equipment during the actual sport, but that only occur when the piece of sporting equipment is intentionally manipulated in a manner by a person wanting to use the equipment to input a change in an operational mode of a computer program or application.

Electronics 42 comprises processor 44, decision module 46, mode adjustment module 48 and recording module 50. Processor 44 comprises one or more processing units configured to follow the instructions provided by modules 46, 48, 50. For purposes of this application, the term "processing unit" shall mean a presently developed or future developed processing unit that executes sequences of instructions or program logic contained in a memory or non-transitory computer readable medium. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, electronics 42 may be embodied as part of one or more application-specific integrated circuits (ASICs). Unless otherwise specifically noted, the controller is neither limited to any specific combination of hardware circuitry and software, nor to any particular source for the instructions executed by the processing unit.

Decision module 46 comprises computer readable program logic contained in a non-transitory computer readable medium. Decision module 46 directs processor 44 in distinguishing between signals received from sensor 40 that are a result of a sport action motion involving the piece of sporting equipment and signals received from sensor 40 that are a result of an intention to input a command or a selection to changing operational mode of an application or program being carried out by or to electronics 42 or other electronics. Depending upon the identification of such signals as being the result of sporting action motion involving the piece of sporting equipment or as being a request to changing operational mode, mode adjustment module 48 or recording module 56 takes further action using such signals.

Mode adjustment module 48 comprises computer readable program logic contained in a non-transitory computer readable medium. Mode adjustment module 48 directs processor 44 to adjust or switch the mode of operation of a program or computer application based upon the signals from sensor 40 that were determined by decision model 46 to be mode input actions rather than sport action motions. Examples of different mode changes switches include, but are not limited to, starting or ending a game managed or tracked by electronics 42, starting or ending a practice session managed or trapped by electronics 42, changing participants in a managed/tracked practice session or gain, changing the type of game or practice session to be initiated, adjusting a handicap or difficulty in such a managed or tracked game, adjusting the point(s) to be associated with a made basket, starting or stopping a timer, changing a sporting action (i.e., e.g., indicating that the practice portion is switching from three-point attempts to free throw attempts or is switching from practice kicks to practice punts), tracking game statistics and/or information, or correcting a prior result that was incorrectly determined using signals from sensor 40.

Results module 50 comprises computer readable program logic contained in a non-transitory computer readable medium. Results module 50 directs processor 44 to record and/or analyze the signals determined by decision model 46 to be signals resulting from a sports action motion. In one implementation, such results are recorded or stored on a non-transitory computer-readable medium that is local to electronics 42. In another implementation, such results are transmitted to remote storage site where the results are recorded or stored.

In one implementation, sensor 40 is carried by a regulation basketball, wherein electronics 42 utilize signals from sensor 40 to determine various results pertaining sport actions involving the basketball, such as, shooting of the basketball. Based upon signals received from sensor 40, results module 50 determines various parameters of each basketball shot such as the arc, distance, force and/or spin imparted to the basketball during a shot. In one implementation, results module 50 additionally utilizes such various parameters to determine whether a shot attempt was successful. In one implementation, results module 50 utilizes such signals to determine the type of basketball shot being attempted, such as whether a shot was a free-throw attempt, a field-goal attempt, the two-point shot, a three-point shot, layup or the like. Results module 50 records and stores each of the determined parameters, the type of shots that were attempted as well as whether or not such shots were successful. In other implementations, the various results pertaining sport actions involving the basketball can relate to the passing, dribbling and/or possession of the basketball.

In another implementation, sensor 40 is carried by a regulation American football. In such an implementation, results module 50 uses signals from sensor 40 to determine various results pertaining to sport action motions involving the football. For example, in one implementation or selectable mode, results module 50 determines a spiral efficiency, a spin rate, a velocity, an acceleration, an arc, and/or a distance of a pass of the football based upon signals from sensor 40. In another implementation or selectable mode, results module 50 determines a revolution, hang time, arc, spin rate, path, and/or distance of a kickoff or punt of the football based upon signals from sensor 40.

In one implementation, results module 50 not only determines and stores results based upon signals received from sensor 40, but also utilizes the determined results as part of a simulated sporting competition or virtual multiplayer sporting competition. For example, in one mode of operation, results module 50 utilizes the determined results as part of a simulated game against a simulated opponent. In another mode of operation, results module 50 utilizes the determined results as part of a virtual multiplayer game against other players at other remote locations across a communication network, such as a local area network or a wide area network (Internet). For example, in one implementation in which sensor 40 is carried by a basketball, results module 50 determines whether basketball shots are made or missed. Results module 50 or another computing server or hub utilizes determinations of made or missed baskets to generate a score for the person or groups of persons utilizing the basketball, wherein the score is compared to the score for another person or groups of persons either locally or at a remote location to facilitate such a multiplayer game. Examples of various simulated sports competitions or virtual multiplayer competitions are described in co-pending U.S. patent application Ser. No. 14/205,073 filed on Mar. 11, 2014 by Thurman et al. and entitled BASKETBALL SENSING APPARATUS, the full disclosure of which is hereby incorporated by reference.

Figure 2:
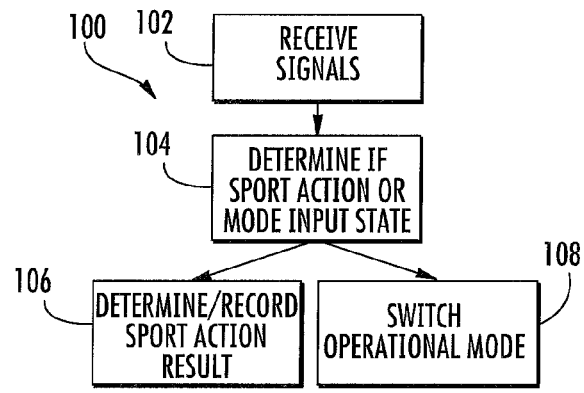
FIG. 2 is a flow diagram of an example method that may be carried out by the sport equipment input control system of FIG. 1.

FIG. 2 is a flow diagram of an example method 100 that may be carried out by the sports equipment input control system 20 of FIG. 1. As indicated by block 102, electronics 42 receives signals from sensor 40. In one implementation, sensor 40 and electronics 42 are both carried by the piece of sport or sporting equipment, wherein signals from sensor 40 are directly transmitted to electronics 42 via a wired, wireless or optical connection. In another implementation, electronics 42 are part of a separate electronic device distinct from the piece of sporting equipment, such as a smart phone, personal data/digital assistant, flash memory player, tablet computer, notebook computer, wrist-top computer or other portable electronic device. In such an implementation, electronics 42 receives signals from sensor 40 across a wireless connection or across a wired connection after electronics 42 have been temporarily connected to or plugged into a communications port of the piece of sporting equipment that is connected to sensor 40. In yet another implementation, electronics 42 are located remote with respect to the piece of sporting equipment as well as remote to the location which the portable electronic device being used. For example, in one implementation, electronics 42 is located at a remote computer server, wherein electronics 42 receives signals from sensor 42 via a transmitter carried by the piece of sporting equipment or via a transmitter carried by a portable electronic device which communicates with a transmitter carried by the piece of sporting equipment.

As indicated by block 104, decision module 46 of electronics 42 determines if the signals received from sensor 40 are the result of the piece of sporting equipment being manipulated in or through a sports action motion or the result of the piece of sporting equipment being manipulated with the purpose of inputting a selection or command so as to change and operational mode, such as that of electronics 42. In one implementation or mode, decision model 46 compares the signals received from sensor 40 to a predetermined or pre-established library of signal patterns. In one implementation or mode, decision module 46 compares the signals from sensor 40 or the patterns of signals from sensor 40 to the pre-established library of signal patterns corresponding to different mode inputs, wherein decision module 46 automatically determines that the signals represent a sport action motion if the signals do not sufficiently match or correspond to any of the signals or signal patterns for the different mode inputs. In yet another implementation or mode, decision module 46 compares signals from sensor 40 or the patterns of signals from sensor 40 to a pre-established library of signal patterns for different mode inputs and a pre-established library of signal patterns for different sporting actions or sport action motions before drawing a conclusion as to whether such signals or the result of a sports action motion or a mode input action. In such an implementation, decision model 46 draw such a conclusion based upon which library entry pattern (whether it be a signal pattern for a sports action motion or whether be a signal pattern for a mode input) best matches the pattern of signals from sensor 40.

As indicated by block 106, in response to a determination by decision module 46 that a set of signals are the result of a sport action motion, results module 50 record/stores one or more sport action results. As noted above, the result that is stored may comprise a characteristic or parameter result of the sport action (the spiral characteristic of a football pass, the backspin on a basketball shot, the arc of a basketball shot, the distance of a field-goal kick and the like) and may alternatively or additionally comprise a target result (whether a basketball shot was made or missed, whether a pass hit a receiver or particular spot on a field, whether a field-goal passed through the goal posts or the like).

As indicated by block 108, in response to a determination by decision module 46 that a set of signals are the result of a request for a mode change, mode adjustment module 48 determines what specific adjustments to the operational mode are being requested based upon the signals or patterns of signals and adjusts an operational mode of a computer program or application, such as how results are being recorded, displayed or used by results module 50. As noted above, examples of different mode changes switches include, but are not limited to, starting or ending a game managed or tracked by electronics 42, starting or ending a practice session managed or tracked by electronics 42, changing participants in a managed/tracked practice session or game, adjusting a handicap or difficulty in such a managed or tracked game, starting or stopping a timer, changing a sporting action (i.e., e.g., indicating that the practice portion is switching from three-point attempts to free throw attempts or is switching from practice kicks to practice upon) or correcting a prior result that was incorrectly determined using signals from sensor 40.

Figure 3:
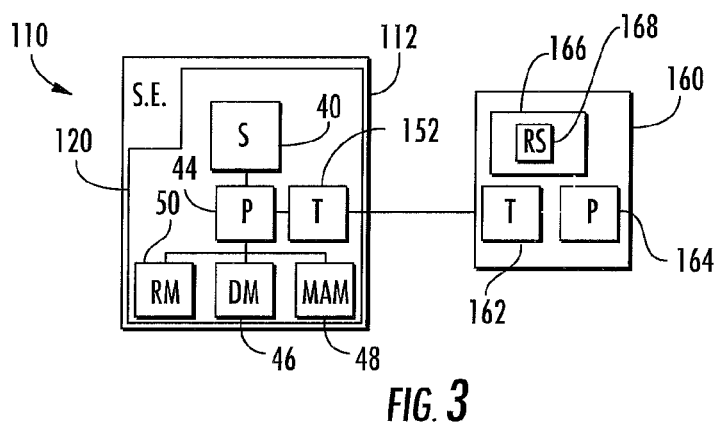
FIG. 3 is a schematic diagram of an example sporting equipment input system.

FIG. 3 schematically illustrates sporting equipment input system 110. Sporting equipment input system 110 comprises sport equipment 112 and sport equipment input control system 120, an example implementation of sports equipment control system 20. Sport equipment 112 comprises a piece of sporting equipment configured to carry, contain and support sport equipment input control system 120. Examples of sporting in 112 include, but are not limited to: a regulation ball glove including a baseball glove, a softball glove, a baseball mitt and a softball mitt; a regulation baseball; a regulation softball; a regulation ball bat including a baseball bat and a softball bat; a regulation sports racquet including a tennis racquet, a badminton racquet, a squash racquet, a racquetball racquet and a paddle ball racquet; a regulation golf club; a regulation golf ball; a regulation basketball; a regulation American football; a regulation volleyball; a regulation soccer ball; a regulation hockey stick; a regulation hockey puck; and a regulation lacrosse stick. In one implementation, sport equipment 12 comprises an external surface upon which sports equipment control system 120 is mounted or coupled. In another implementation, sport equipment 112 comprises an internal cavity for containing electronics and components of the sports equipment control system 120.

Sports equipment control system 120 is similar to sports equipment control system 20 except that sports equipment control system 120 additionally comprises transmitter 152. Those remaining components or electronics of sports control system 120 are numbered similarly. Transmitter 152 is built into or incorporated into sport equipment 112. Transmitter 152 is configured to transmit and receive signals with respect to external computing devices or electronics. Transmitter 152 to facilitate the transmission of results from results module 50 to an external or remote storage site 160.

Remote storage site 160 remotely stores the results output by results module 50. In the example illustrated, remote storage site 160 comprises transmitter and/or receiver 162, processor 164 and memory 166 having a results storage portion 168. Transmitter 162 receives signals from transmitter 152 indicating or corresponding to the results determined by results module 50. Processor 164 comprises one or more processing units which store the results in results storage portion 160 of memory 166. In the example illustrated, transmitters 152, 162 communicate with one another across a wireless network, such as a local area network or a wide area network (Internet). In yet other implementations, remote storage 160 may be omitted, wherein results module 50 stores the results locally within a non-transitory-computer-readable medium or memory carried by sport equipment 112.

Figure 4:
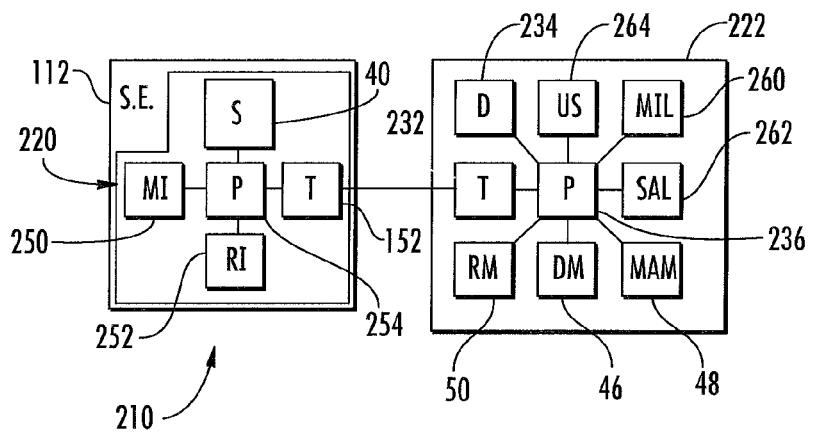
FIG. 4 is a schematic diagram of another example sporting equipment input system.

FIG. 4 schematically illustrates sporting equipment input system 210. Sporting equipment input system 210 is similar to sporting equipment input system 110 except that system 210 comprises sport equipment input control system 220 in lieu of the control system 120. The remaining components or elements of system 210 correspond to components are elements of system 110 are numbered similarly in FIG. 4 or are shown in FIG. 3.

Sport equipment input control system 220 is distributed across sport equipment 112 and a remote, separate or independent electronic device 222. In the example illustrated, remote electronic device 222 comprises a portable electronic device such as a smart phone, a personal data or digital assistant, flash memory player, a cell phone, a tablet computer, a notebook or laptop computer, a wrist-top computer or the like. In yet another implementation, remote electronic device 222 comprises a remote device in communication with sport equipment 112 across a network, such as a wide area network or a local area network. In one implementation, electronic device 222 is provided as part of a remote computer server.

As shown by FIG. 4, electronic device 222 comprises transmitter 232, display 234 and processor 236. Transmitter 232 comprises an electronic component to communicate with transmitter 152 associated with sporting equipment 112. In one implementation, transmitter 232 comprises a wireless transmitter to communicate with transmitter 152 in a wireless fashion through optical signals or radio wave signals. In one implementation, transmitter 232 communicates with transmitter 152 across a network, such as a local area network or a wide area network.

Display 234 comprises a monitor, screen, panel or the like by which information is visibly presented to a person. In one implementation, display 234 comprises a touch screen also serving as an input device. In yet another implementation, electronic device 222 comprises an independent input device, such as a keyboard, touchpad, microphone with associated speech recognition software; mouse, stylus and the like. In one implementation, display 234 may comprise a panel having lights, such as light emitting diodes, which are selectively illuminated to present information.

Processor 236, similar to processor 44 of system 120, comprises one or more processing units to carry out instructions provided by decision model 46, mode adjustment module 48 and results module 50. Each of decision model 46, mode adjustment module 48 and results module 50 are described above.

As shown by FIG. 4, in addition to carrying sensor 40 and transmitter 152 as described above with respect to system 120, sport equipment 112 of system 220 carries mode indicator 250, results indicator 252 and processor 254. Mode indicator 250 comprises a device carried by sport equipment 112 that indicates the current operational mode of results module 50. For example, in one implementation, mode indicator 250 indicates whether results module 50 is recording or storing results as part of a simulated game, a virtual multiplayer game or a practice session. In one implementation, mode indicator 250 indicates whether results module 50 is storing and analyzing results for a particular sport action, such as whether results module 50 is storing and analyzing results for punts of a football versus kickoffs or field goal kicks of a football. In one implementation, mode indicator 250 indicates the current handicap or difficulty level that is being applied by results module 50. Mode indicator 250 provides the person handling or manipulating sport equipment 112 to quickly and easily determine the current operational mode of results module 50 while using sporting equipment 112 without having to interrupt a sport to access such information on electronic device 222. Mode indicator 250 further allows the person to confirm whether or not a requested operational mode change for results module 50 has been recognized and implemented.

In one implementation, mode indicator 250 comprises one or more selectable light emitting devices, such as one or more light emitting diodes. In one implementation, the on/off state of such light emitting devices, the brightness of such light emitting devices, the frequency of illumination of such light emitting devices and/or the color of light emitted by such light emitting devices to selectively controlled by processor 254 to indicate the current operational mode status of results module 50.

In another implementation, mode indicator 250 comprises an audible device configured to emit a beep or other sound in response to control signals from processor 254 indicating the current operational mode or status of results module 50. In one implementation, the on/off state of the audible device, the volume of the audible device, the frequency of beeps or sounds emitted by the audible device and/or the nature of the sound/words emitted by such the audible device is selectively controlled by processor 254 to indicate the current operational mode status of results module 50.

In another implementation, mode indicator 250 comprises a miniature display region carried by sporting equipment 112. For example, in one implementation, mode indicator 250 may comprise a flexible optical light emitting diode or material carried by sporting equipment 112 and configured visibly present information regarding the operational status or mode of results module 50 under the control of processor 254.

Results indicator 252 comprises a device carried by sport equipment 112 that indicates the most recent results determined by results module 50 based upon signals received from sensor 40. As a result, the person handling or manipulating sporting equipment 112 can immediately or in real time determine whether results module 50 has drawn a correct conclusion or determined a correct result based upon signals from sensor 40. In one implementation, results indicator 252 facilitates real-time correction of results when needed. In one implementation, such correction not only facilitates accurate results of the ongoing game or practice, but allows results module 50 to calibrate itself or learn from such corrected mistakes for enhanced future accuracy in identifying results based upon signals from sensor 40.

For example, in one implementation in which sporting equipment 112 comprises a basketball, results indicator 52 indicates whether the last shot attempt was identified as a made basketball shot or a missed basketball shot based upon signals from sensor 40. In such an implementation, the person is immediately notified as to whether the result of the just completed shot attempt was correctly identified by results module 50. As will be described hereafter, in circumstances where results module 50 incorrectly identified the shot as a made shot or incorrectly identified the shot as a missed shot, the person may manually change or correct the prior result.

In one implementation, results indicator 252 comprises one or more selectable light emitting devices, such as one or more light emitting diodes. In one implementation, the on/off state of such light emitting devices, the brightness of such light emitting devices, the frequency of illumination of such light emitting devices and/or the color of light emitted by such light emitting devices to selectively controlled by processor 254 to indicate the results determined by results module 50.

In another implementation, results indicator 252 comprises an audible device configured to emit a beep or other sound in response to control signals from processor 254 the most recent results determined by results module 50. In one implementation, the on/off state of the audible device, the volume of the audible device, the frequency of beeps or sounds emitted by the audible device and/or the nature of the sound/words emitted by such the audible device is selectively controlled by processor 254 to indicate the most recent results determined by results module 50.

In another implementation, results indicator 252 comprises a miniature display region carried by sporting equipment 112. For example, in one implementation, results indicator 252 may comprise a flexible optical light emitting diode material carried by sporting equipment 112 and configured to visibly present information regarding the most recent results determined by results module 50 under the control of processor 254. The one or more light emitting diode or material may be part of the outer surface of the sport equipment 112, or beneath a translucent or transparent component extending over a portion of the outer surface of the sport equipment 112.

In one implementation, mode indicator 250 and results indicator 252 are provided by a single indicator which indicates both the current operational mode of results module 50 as well as the most recent results determined by results module 50 based upon signals from sensor 40. In one implementation, one characteristic or set of characteristics of the single indicator are selectively controlled/adjusted to indicate the current operational mode while a different characteristic or different set of characteristics of the single indicator are selectively controlled/adjusted to indicate the most recent results determined by results module 50. Combining mode indicator 250 and results indicator 252 facilitates lower cost and allows indicators 250, 252 to occupy less space and to be less conspicuous on sporting equipment 112.

In one implementation in which sporting equipment 112 comprises a football, indicator 250 and/or indicator 252 can comprise a light emitting device embedded within or alongside the laces of the football. In one implementation in which sporting equipment 112 comprises a softball or baseball, indicator 250 and/or indicator 252 can comprise a light emitting device embedded within or alongside the stitches of the ball. In one implementation in which sporting equipment 112 comprises a basketball, indicator 250 and/or indicator 252 can comprise a light emitting device embedded within or alongside a logo resource identifier on the basketball or within the recessed seams of the basketball. In one implementation, indicator 250 and/or indicator 252 are located within sporting equivalent 112 behind the transparent panel or other transparent portion of sporting equipment 112. In such implementations, because such indicators 250, 252 are recessed within or behind the outermost playing surfaces of the ball, indicators 250, 252 are less conspicuous during sporting actions (when the person is not looking for indicators 250, 252) and are less likely to interfere with gripping or manipulation of the sporting equipment.

In implementations where sporting equipment 112 comprises a handle, such as the handle of a tennis racquet, the handle of a golf club, the handle of a hockey stick in the like, indicator 250, 252 can be located on a butt end of the handle. As a result, indicator 250, 252 not interfere with the gripping of the handle, or quickly and easily found in viewed when desired and do not interfere with interaction of the handle device respect to a projectile such as a tennis ball, golf ball or hockey puck. In other implementations, indicator 250 and/or 252 can be positioned or coupled to a tapered region of a ball bat, an end cap of a ball bat, the handle of a racquet, the yoke of a racquet, the palm of a ball glove, the back side of a ball glove, the crown of a golf club head, and as part of a cover panel of a sport ball. In still other implementations, indicator 250 and/or 252 is located at other locations on such pieces of sporting equipment.

As further shown by FIG. 4, in addition to containing a non-transitory computer-readable medium or memory containing decision model 46, mode adjust module 48 and results module 50, electronic device 222 additionally comprises mode input library 260, sports action motion library 262 and user settings module 264. Mode input library 260 comprises a database of mode input action entries and their corresponding mode input values, commands or selections. In one implementation, each mode input action entry comprises a pattern of signals for comparison to the signals being received from sensor 40. In another implementation, each mode input action entry comprises a state of the piece of sporting equipment 112, wherein decision module 46 first identifies or determines the state of the piece of sporting equipment from the pattern of signals from sensor 40 and then compares the determined state of the piece of sporting equipment 112 to the various equipment states listed in the entries of library 260. The "state" of the piece of sporting equipment 112 may be the orientation of equipment 112, the position of equipment 112 relative to a reference location, impacts against or by sporting equipment 112, rotation or spinning of sporting equipment 112 or any of various combinations thereof. In one implementation, the mode input action entries of library 260 comprise signal patterns and/or determined sport equipment states which are not the result of sport action motions and which do not occur naturally during a competition using the piece of sporting equipment 112. In other words, during normal use of equipment 112 during a game, match or round, equipment 112 will not exhibit or undergo the particular position and/or movement that produces a signal pattern entry or a equipment state entry in library 260 that is linked to a particular mode input by library 260. For example, during a tennis match or during tennis practice, the piece of sporting equipment 112 (a tennis racquet) will not accidentally be spun, impacted and/or oriented in a manner defined by one of the mode input action entries of library 260 corresponding to a mode input. During a basketball game, during a shooting game (around the world, horse, pig) or during a practice shooting session, the piece of sporting equipment 112 (a basketball) will not accidentally be spun about a predefined axis, impacted and/or oriented as defined by one of the entries (whether it be a determined state or a determined signal pattern) in library 260 corresponding to a mode input. During a football game, during a practice session involving the throwing, kicking or punting of the football, the piece of sporting equipment 112 (a football) will not accidentally be spun, impacted and/or oriented as defined by one of the entries in library 260 corresponding to a mode input. As a result, decision module 46 is less likely to incorrectly interpret a normal sport action motion involving equipment 112 as a mode input action corresponding to a mode input.

In one implementation, mode input actions, having entries in library 260 either in the form of signal patterns or in the form of equipment states which represent different mode inputs, comprise actions that comprise a predefined spin of equipment 112 while piece of sporting equipment 112 is stationary, not translational, wherein the predefined spin satisfies one or more thresholds such as the sporting equipment 112 being spun for a predefined or minimum period of time, the sporting equipment one and 12 being spun for a predefined number of revolutions or the sporting equipment one and 12 being spun for a predefined rotational frequency. Such predefined thresholds may be in the form of a predefined minimum, a predefined maximum and/or a predefined range.

In one implementation, different mode input actions may further be distinguished from one another or identified based upon which predefined axis that sporting equipment 112 is spun about. For example, a first mode input may be indicated by spinning of the ball about a first predefined axis while a second different mode input may be indicated by spinning the ball about a second predefined axis.

Examples of different sporting equipment mode input actions include, not limited to, a predefined spin of a stationary regulation basketball, a predefined spin of a stationary regulation football, a predefined spare of a stationary soccer ball, a predefined spin of a stationary regulation tennis racquet, a predefined spin of a stationary regulation golf club, a predefined spin of a stationary regulation, a predefined cinema stationary regulation basketball, predefined spin stationary regulation softball and/or a predefined spin regulation stationary soccer ball. The predefined spin pattern (amount of spin and/or spin axis) can be two or more spins in opposite directions (for example, the spin pattern can be a half rotation of the sporting equipment 112 in one direction followed by a half rotation in the opposite direction). In other implementations, other patterns of spins, spins and impacts/contacts, and impacts/contacts can be used.

In one implementation, various mode input actions which may indicate or represent different modes inputs include different impacts or impact manners with respect to the sporting equipment 112. Different mode inputs are represented by different impacts which vary in one or more locations, force, number and/or frequency. For example, a first mode input is indicated for represented by the piece of sporting equipment 112 impacting another object or structure or being impacted by another object or structure at a particular location on equipment 112. A second mode input is indicated or represented by equipment 112 being impacted a particular number of times already particular frequency. A third mode input is indicated by equipment 112 being impacted with a particular amount of force. A fourth mode input is indicated by equipment 112 being impacted with a particular force at a particular location. A fifth mode input is indicated by indicated by 112 being impacted at a particular location and at a particular frequency. Such predefined thresholds, alone or in any combination, may be in the form of a predefined minimum, a predefined maximum and/or a predefined range.

Examples of different sporting equipment mode input actions involving impact with or by equipment 112 include, not limited to, a predefined series of one or more taps of a stationary regulation basketball; a predefined series of one or more taps of a stationary regulation football; a predefined a predefined series of one or more taps of a stationary soccer ball; a predefined a predefined series of one or more taps of a stationary regulation tennis racquet; a predefined a predefined series of one or more taps of a stationary regulation golf club; a predefined series of one or more taps of a stationary regulation bat; a predefined a predefined series of one or more taps of a stationary regulation baseball; a predefined a predefined series of one or more taps of a stationary regulation softball; and a predefined a predefined series of one or more taps of a regulation stationary soccer ball. Such predefined thresholds or values may be in the form of a predefined minimum, a predefined maximum and/or a predefined range.

In yet another implementation, different mode inputs may be indicated or represented by positioning of equipment 112 at a particular predefined orientation for predefined period of time. For example, a particular mode input may be indicated by a tennis racquet or a baseball bat be held upside down first predefined period of time. In some implementations, different mode inputs may be indicated by a combination of different positions/motions of equipment 112. For example, different mode inputs may be indicated depending upon the particular orientation equipment 112 is in while equipment 112 is being impacted and/or being spun. In other implementation, the pre-defined pattern can be any combination of one or more spins, taps, impacts, and orientations of the sport equipment 112.

FIG. 5A illustrates mode input library 360, and an example implementation of mode input library 360. As shown by FIG. 5A, library 360 can comprise a lookup table which includes various predetermined mode inputs in the left column and assigned or corresponding mode input action entries (in the form of equipment states as compared to signal patterns) in the right column. For example, in response to determining that the piece of sport equipment is in orientation B based upon signals from sensor 40, decision module 46 determines that the input is a request to stop the timer in the ongoing programmer application and carried out by results module 50. In response to determining that the piece of sports equipment 112 is in orientation A while being impacted or tapped a location Y of the piece of sporting equipment 112, based upon signals from sensor 40, decision module 46 determines that the input is a request to initiate a new practice session in the ongoing program or application and carried out by results module 50. In response to determining that the piece of sport equipment 112 is being spun in a certain manner, spin B (in a particular predefined direction, for a particular predefined number of revolutions, at a particular predefined frequency or rate), based upon signals from sensor 40, decision module 46 determines that the input is a request to change a level of difficulty in the ongoing program or application and carried out by results module 50. In response to determining that the piece of sport in equipment is being tapped at a particular location Z, based upon signals from sensor 40, decision module 46 determines that the input is a request to change or correct one or more prior results incorrectly identified by results module 50. In other implementations, library 360 and/or library 260 may have other configurations having other linked mode input with other mode input actions.

Figure 5B:
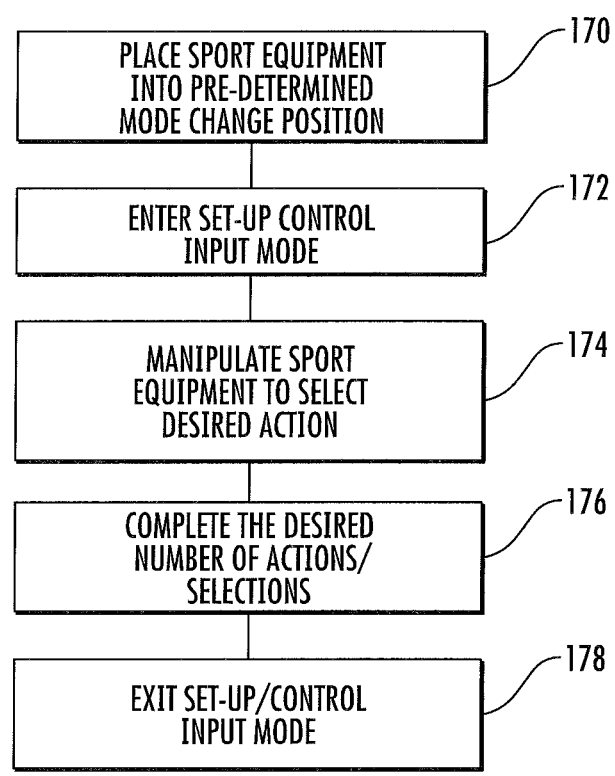
FIG. 5B is a flow diagram of an example method that may be carried out by the sport equipment input control system of FIG. 4.
Figure 5C:
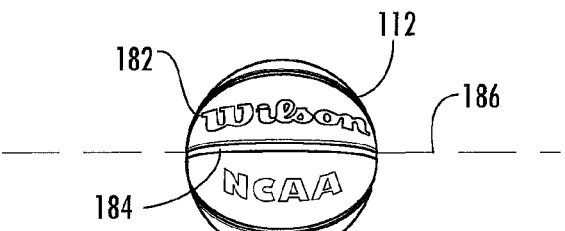
FIG. 5C is a front view of a basketball shown in an initial mode change position.

Referring to FIG. 5B, a method of entering and exiting the sporting equipment input system 110 of a piece of sport equipment 112 is shown. In step 170, the sport equipment 112 can be placed into a mode change position. The mode change position can be a predetermined position/orientation of the sporting equipment input system 110. The input control system 120 can be used to store the mode change position of each type of sporting equipment 112, and/or to allow a user to change or define a unique mode change position, if desired by the user. Referring to FIG. 5C, one example of an initial mode change position for a piece of sport equipment 112 is shown. In this implementation, the sport equipment 112 is a basketball including indicia 182 and a plurality of seams. The basketball 112 is positioned about an axis 186 with the indicia 182 facing the user and a central seam 184 extending generally parallel to the axis 186.

Figure 5D:
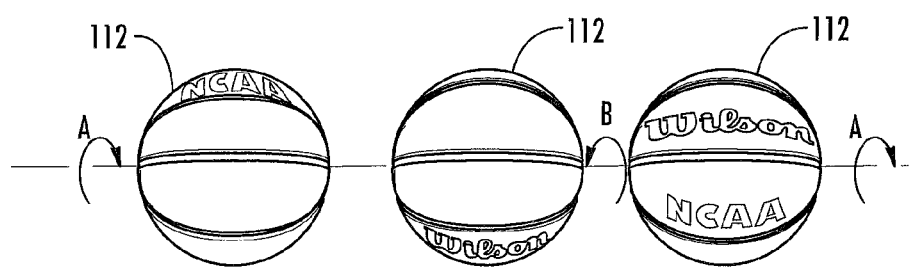
FIG. 5D is a series of images of the basketball of FIG. 5C illustrating an example predetermined input mode initiation action.

Referring to FIG. 5B and step 172, the sport equipment can be manipulated according to a predetermined input mode initiation action or series of actions. Referring to FIG. 5D, an example implementation of an input mode initiation action is illustrated. The basketball 112 begins in the initial mode change position of FIG. 5C, the user then rotates the basketball 112 about the axis 186 in a first rotational direction A approximately a quarter of a revolution of the basketball 112. The user then reverses the rotation of the basketball 112 and rotates the basketball 112 about the axis 186 in a second rotational direction B (opposite the first rotational direction) by one half of a rotation of the basketball. The user then rotates the basketball a third time by a quarter of a rotation in the first rotational direction A until the basketball 112 returns to the initial mode change position. Sensors 40 of the basketball 112 communicate the rotational motions of the ball 112 to the decision model 46.

The decision module 46 compares the signals received from sensor 40 to a predetermined or pre-established library of signal patterns, and identifies the signals as the input mode initiation pattern.

Figure 5E:
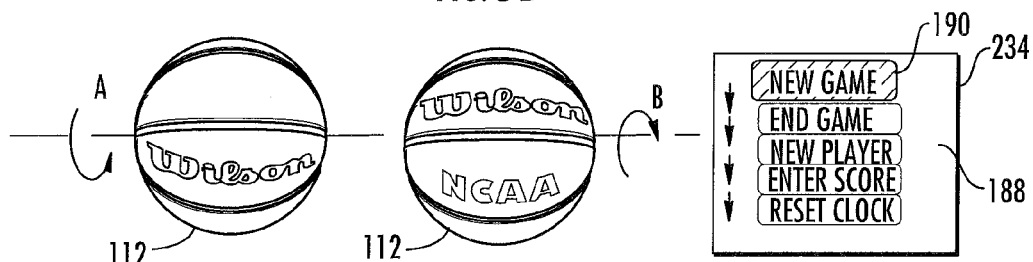
FIGS. 5E through 5G illustration an implementation of the basketball of FIG. 5C used to navigate or use a series of displays or an application.
Figure 5F:
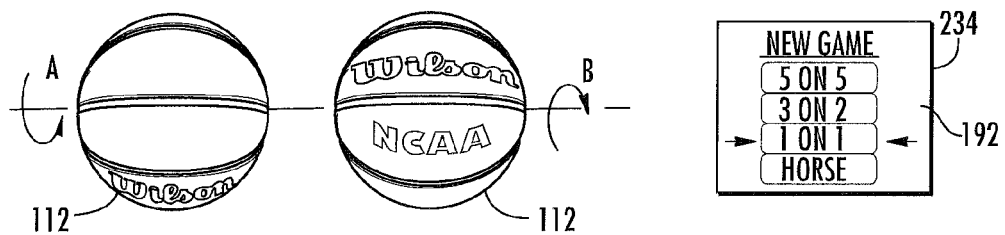
Figure 5G:
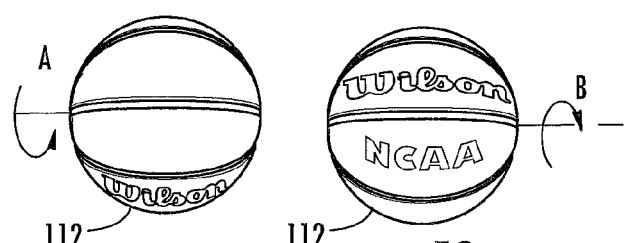

Referring to FIG. 5E, when the input mode initiation pattern is identified by the decision module, the basketball 112 is placed into the set-up control input mode (and exits the sport action mode or sport action sensing mode). An opening menu 188 can be displayed onto the display 234 that provides a plurality of selectable options for the user. Referring to FIGS. 5B and 5E in step 174, the basketball 112 can be manipulated to select a desired action on the display 234. Referring to step 176, predetermined movements or gestures with the basketball 112 can be used to move through and/or to select desired options within the display. For example, the basketball 112 can be rotated a quarter revolution in the first rotational direction A and then rotated back in the second rotational direction to make a selection of the option "new game" 190 available on the display 234. Referring to FIG. 5F, once new game is selected a new window 192 can appear on the display 234 illustrating available new games. The rotation of the basketball 112 (or other predefined movement or gesture) can be used to move among available options displayed on the display 234. For example, the rotational movement of the basketball 112 can be used to move the selection from "5 on 5" to "3 on 3", and then to "1 on 1". When the "1 on 1" option is selected, referring to FIG. 5G, another window 194 can be displayed on the display 234 requesting the selection of a duration for the game, and a scroll of adjustable game times can be selected by manipulating the basketball 112 with rotational movements about the axis 186.

Once the desired number of selections have been made by the user, in step 178, the predetermined input mode initiation action of FIG. 5D (or another predetermined action or gesture), can be employed by the user to exit the set-up/control input mode and return the basketball 112 to a sports action mode. FIGS. 5B through 50 illustrate one example implementation of the sporting equipment input system 110. In other implementations, one or more other predetermined actions or gestures can be used. Further, the number of available screens can vary depending upon a particular application.

Referring to FIGS. 4 and 6, sport action library 262 comprises a database of various sport actions or sport action motions involving the piece of sporting equipment 112. Such sport action motions inherently or naturally occur during use of equipment 112 during a game, a match, round or other competitive play. In contrast to the above-described mode input actions, such sport action motions occur during competitive play, such actions also occur during practice sessions intended to improve such actions for subsequent use during competitive play. With respect to a basketball, a sport action motion can comprise a large number of actual sporting actions, such as for example, dribbling, shooting, passing or catching of the basketball, movement of the basketball along the playing surface, impact of the ball with a net, a backboard and/or rim, and impact of a basketball due to contact by a defender's hand. With respect to a football, a sport action motion can comprise kicking of the football, punting of the football, a handoff of the football, a throw of the football, a catch of the football, a spike of the football, an impact of the football with the goalposts, a carry of the football while the person caring the football is being tackled, a fumble of the football, rolling or movement of the football along the playing surface/football field, an impact with a defender, and the like. With respect to baseball or softball, the sport action can comprise throwing of the ball, catching up the ball, movement of the ball along the playing surface, hitting the ball, impact of the ball with the ground, impact of the ball with bat, impact of the ball with a playing glove, repositioning of the ball within the playing glove, impact of the ball off of a wall or other portion of the field. With respect to soccer, sport action motion can comprise rolling of the ball along the playing surface, kicking of the ball, throwing of the ball, impact of the ball against the goal net or surrounding goal bars, impact of the ball by a defender, heading of the ball, catching of the ball by a goalie. As noted above, such sport action motions result in sensor 40 outputting signals or signal patterns which are associated with such sport actions which are different than the signals or signal patterns associated with mode input actions of the equipment 112.

FIG. 6 illustrates sports action motion library 362, an example of sports action motion library 262. Library 362 comprises a lookup table of various different signal patterns (numerically identified and listed) in the left column and their associated sport action motions in the right column. In the example illustrated, library 362 is a library for a piece of sporting equipment 112 comprising a basketball. Library 362 includes multiple sport actions involving the basketball and their corresponding signal patterns. Although library 362 comprises action such as a dribble, bounce pass, shot, net, rim impact, backboard impact, library 362 may additionally include a greater or fewer of such sport actions involving a basketball.

Figure 7:
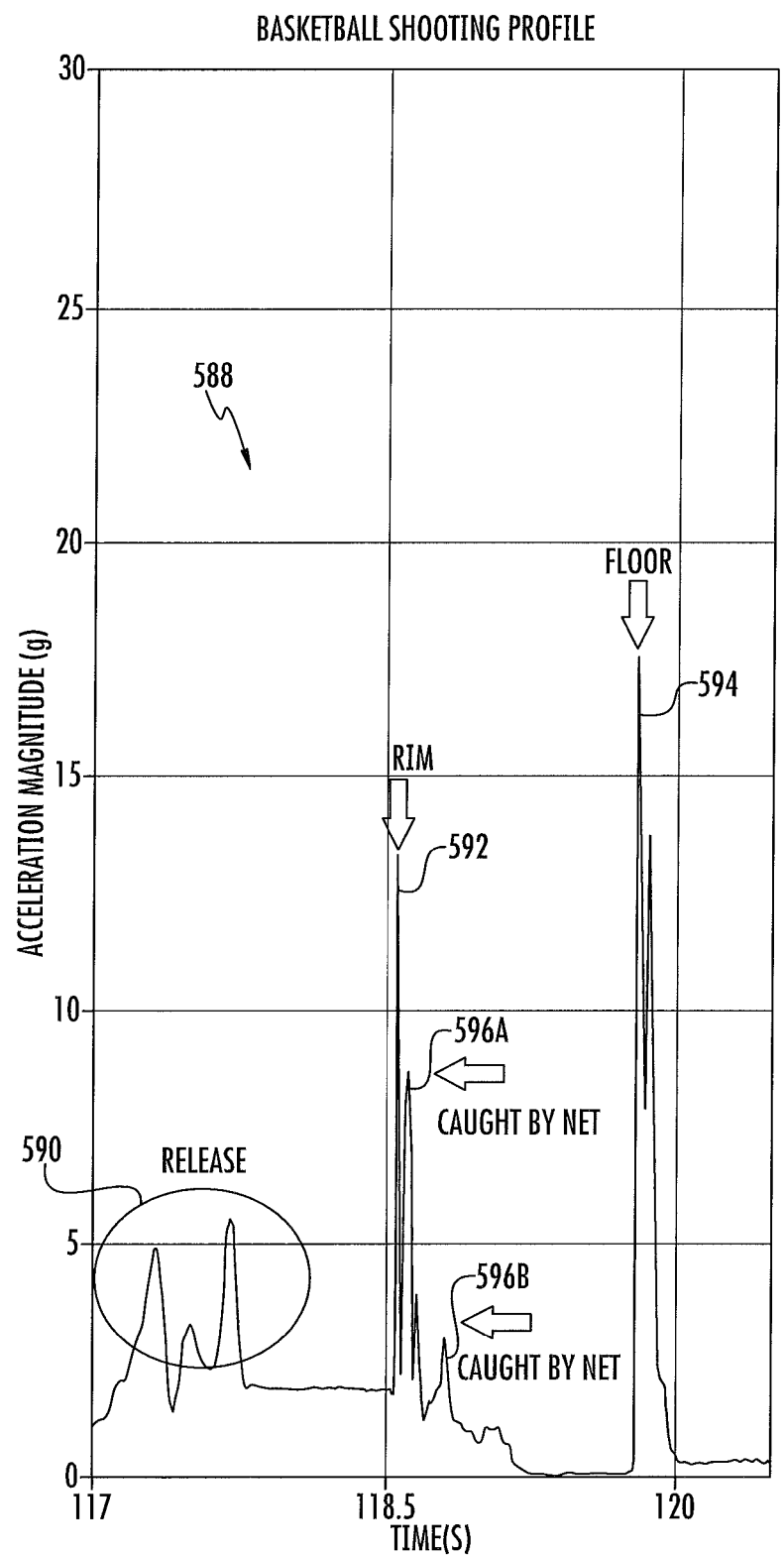
FIG. 7 is a graph illustrating example signal patterns for different example sport action motions of a basketball.

FIG. 7 illustrates an example of various signal patterns that may be included in library 362. FIG. 7 is a graph of the magnitude of acceleration signals received over time from a sensor 40 carried by a regulation basketball 112 during a shot attempt. As shown by FIG. 7, each of the actions of releasing the basketball, the basketball impacting the rim, the basketball being caught by the net in the basketball subsequently falling to the floor have a relatively distinctive acceleration pattern, fingerprint or signature. In one implementation, sport action library 262 comprises a database of such signatures and their associated sport actions. By comparing received signals from sensor 42 such a database, decision module 46 determines whether the signals are the result of the basketball undergoing one or more of such sport actions or whether the signals are the result of the basketball being manipulated in a manner and with the intent for a mode input to change an operational state of results module 50.

FIG. 8 illustrates sports action motion library 462, an example implementation of library 262. Sports action motion library 462 comprises a lookup table of various different signal patterns (numerically identified and listed) in the left column and their associated sport action motions in the right column. In the example illustrated, library 462 is a library for a piece of sporting equipment 112 comprising a football. Library 462 includes multiple sport actions involving the football and their corresponding signal patterns. Although library 462 comprises action such as a snap, drop, past release, catch, ground impact, punt, kick, kick hold and the like, library 362 may additionally include a greater or fewer of such sport actions involving a football.

Figure 9:
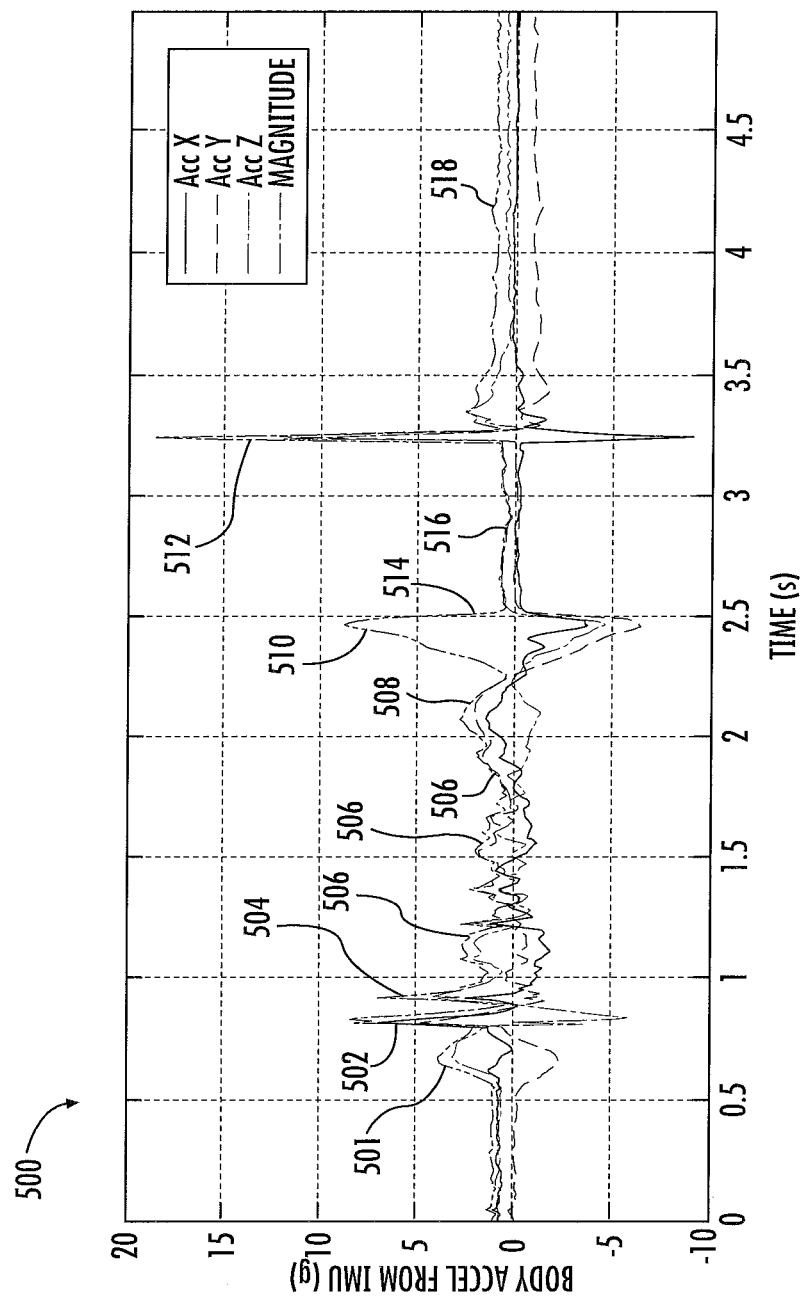
FIG. 9 is a graph illustrating example signal patterns for different example sport action motions of a football.

FIG. 9 illustrates an example football event acceleration trace signature for a continuous series of football events. In particular, FIG. 9 illustrates signals output for acceleration along X, Y and Z orthogonal axes along with a magnitude tracing. FIG. 9 illustrates an example football acceleration trace signature for an under center snap, a three step quarterback drop, pass and catch. Trace 500 of acceleration comprises amplitude spikes that occur in response to the ball being snapped (spike 501), in response to the ball being received under center by impacting the quarterback's hands (spike 502), in response to the ball being withdrawn from beneath the center by the quarterback (spike 504), in response to each of the rearward drop back steps taken by the quarterback (spikes 506), in response to the drawback (cocking or drawback) of the quarterback's arm carrying the ball (the initiation of a pass) (spike 508), in response to the forward motion of the arm in the launch of the ball (spike 510), in response to impact of the ball with the receivers hands, chest or the like during a catch (spike 512). As shown by FIG. 6, at completion of the launch indicated by spike 510, forces no longer being applied to the ball such that acceleration drops as indicated by portion 514. While in flight, acceleration remains substantially constant or declines as indicated by portion 516 of trace 500. As indicated by portion 518 of trace 500, the ball remains generally static while in the receiver's hands after a catch, reflected by the fact that no acceleration spikes take place. Although portion 516 of trace 500 is illustrated as lasting 0.6 seconds, the length of this portion will vary depending upon the length, acceleration, speed, launch angle, and environmental conditions at the time of a throw/pass. Utilizing this length and a detected acceleration or speed of football 450, a distance of a throw/pass may be calculated by module 460. Should a fumble occur after a catch, acceleration spikes would be exhibited and identified.

Although traces 500 and 588 of FIGS. 9 and 7 illustrate a continuous series of events, football and basketball event signatures may comprise distinct events not part of a series of events. In some implementations, the database forming event signature storage 462 can be established by sensing multiple calibration samples of a single known or pre-identified event or multiple calibration samples of few known or pre-identified consecutive football or basketball events and storing their associated acceleration traces. In some implementations, the database forming event signature storage 462 is established by sensing several continuous series of known events and subsequent parsing out the individual events and storing the individual football or basketball events as separate items. In yet another implementation, event signature 462 may be established by storing multiple continuous series or sequences of known events. In some implementations, statistical procedures, such as averaging, cropping, normalizing and the like may be applied to the captured calibration traces when establishing the football or basketball event signature acceleration traces.

Figure 10:
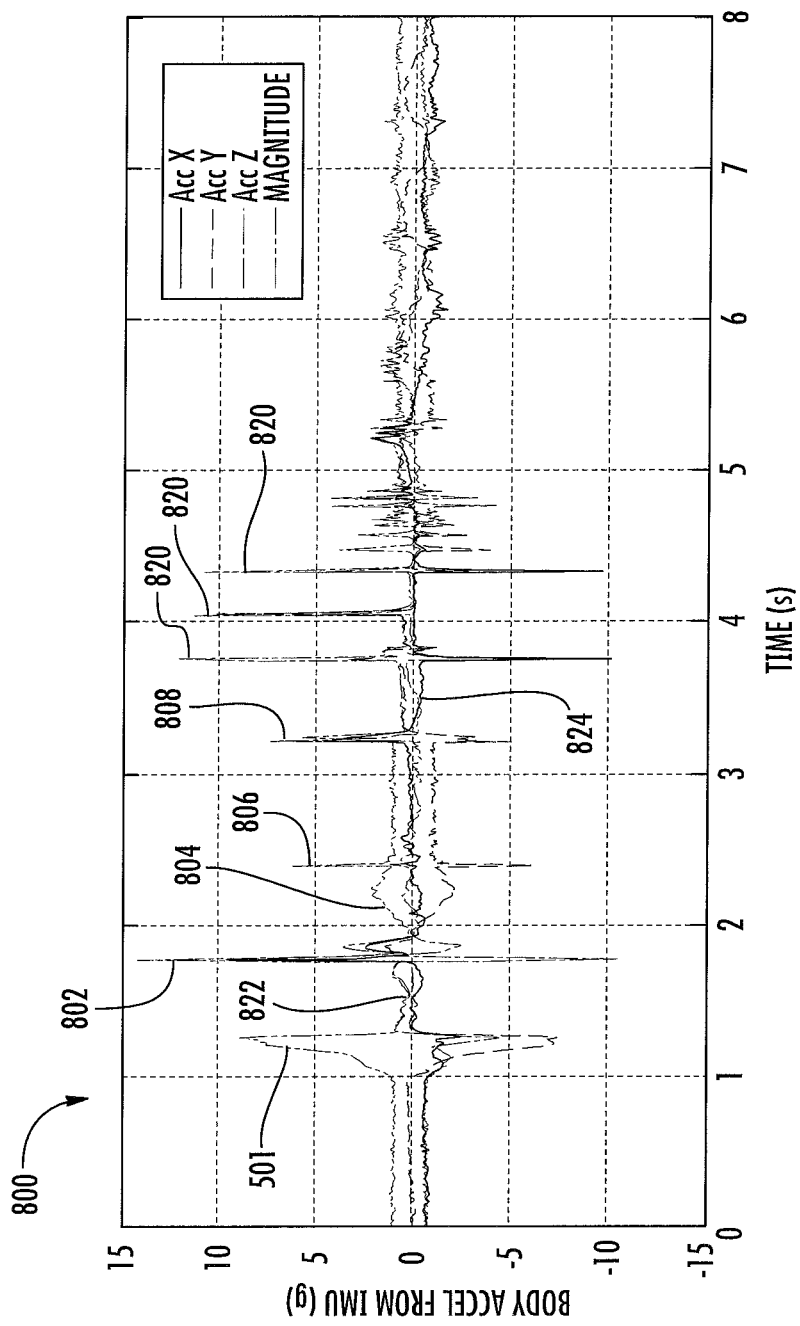
FIG. 10 is another graph illustrating example signal patterns for different example sport action motions of a football.

FIGS. 10 and 11 illustrate example acceleration traces serving as signature traces for continuous series of football events involving kicking and punting of football. As with the above signature traces, FIGS. 10 and 11 illustrate signals output for acceleration along X, Y and Z orthogonal axes along with a magnitude tracing. FIG. 10 illustrates an example trace 800 produced by a continuous series of football events during an example field goal kick that is short or which impacts the ground rather than being caught by a net or a capture behind the goalpost. As shown by FIG. 10, trace 800 of acceleration comprises amplitude spikes that occur in response to the ball being snapped (spike 501), in response to the ball being received by the hands of a holder (spike 802), in response to the ball being lowered to the ground by the holder (spike 804), in response to the ball impacting and placed on the ground (spike 806), in response to the ball being impacted by the kicker's foot (spike 808), and in response to the ball subsequently bouncing or impacting the ground after flight (spikes 820). In other implementations where the field-goal is good and the football is caught by a net behind the goalpost or is caught by a catcher, spikes 820 may not occur or may be omitted from signature trace 800. As further shown by FIG. 11, the flight of the football from the snap to the holder is represented by portions 822 of trace 800. The flight of the football following the kick is represented by portion 824 of trace 800. Although portion 824 of trace 800 is illustrated as lasting less than one second, the length of this portion will vary depending upon the length, acceleration, speed, launch angle, and environmental conditions at the time of the kick. Utilizing this length and a detected acceleration or speed of football, a distance of a kick may be calculated by module 460. A fake field goal would have a different acceleration signature trace.

FIG. 11 illustrates an example trace 900 produced by a continuous series of football events during an example punt that impacts the ground rather than being caught. As shown by FIG. 11, trace 900 of acceleration comprises different spikes corresponding to different football events in the series. Different spikes having different shapes and/are different amplitude occur or are produced in response to the ball being snapped (spike 501), in response to the ball being received by the hands of the punter (spike 902), in response to the steps by the punter prior to the punt (spikes 906), in response to the ball being impacted by the punter's foot (spike 908), and in response to the ball subsequently bouncing or impacting the ground after flight (spikes 920). In other implementations where the punted football is caught, spikes 920 may not occur or may be omitted, or may be a single spike from signature trace 900. As further shown by FIG. 11, the flight of the football from the snap to the holder is represented by portions 922 of trace 900. The release of the ball by the punter prior to the ball being punted is indicated by portion 923 of trace 900. The flight of the football following the punt, or hang time, is represented by portion 924 of trace 900. Although portion 924 of trace 900 is illustrated as lasting less than one second, the length of this portion will vary depending upon the length, acceleration, speed, launch angle, and environmental conditions at the time of the punt. Utilizing this length and a detected acceleration or speed of football, a distance of a punt may be calculated by module 460. A fake punt would have a different acceleration signature trace.

Referring to FIG. 4, user selection module 264 comprises program logic stored in a non-transitory computer-readable medium of electronic device 222. User selection module 264 directs processor 236 in the display of current settings and the prompting for changes to the current settings for use by decision module 46 and mode adjustment module 48. In the example illustrated, user selection module 264 allows a user to change or set what signal patterns and/or what position/motions of equipment 112 (collectively referred to as mode input actions) correspond to particular mode inputs. For example, in one implementation, user settings module 264 allows a user to change what mode input actions in the right column of library 360 in FIG. 5 correspond to the particular mode inputs listed in the left column of the lookup table of library 360 in FIG. 5. For example, instead of requiring a user to tap equipment 112 at location Z to correct a prior determined result of results module 50, library 360 may be changed through the use of user settings module 264 to alternatively enter a correction mode in which a prior result may be corrected upon receiving signals from sensor 40 the officially matching an alternative predefined pattern or corresponding to a different mode input action, for example, in response to the equipment 112 being tapped at an alternative location L or being spun with a characteristic C. In one implementation user in 264 allows the user to switch or exchange what mode inputs are carried out in response to particular sensed or determined mode input actions involving equipment 112. In other implementations, such as the implementation of FIG. 5C through 5G, one predetermined pattern of one or more movements, gestures, motions or impacts can be used to move the equipment 112 between the sports action mode and the set-up control input mode, and a second predetermined pattern of one or more movements, gestures, motions or impacts can be used when in the input mode to navigate through an application on the remote electronic device 222. In this manner, the same movements or gestures (or groups of movements and gestures) can be used to move through display screens and to make selections on display screens.

FIG. 12 illustrates an example screenshot 1000 presented by processor 236 on display 234 in response to instructions provided by user settings module 264. As shown by FIG. 12, screenshot 1000 identifies the mode input selected by the user for change at a top of the display 234. In one implementation, the user may be presented with a library, such as library 360 shown in FIG. 5, or the user may touch, point to otherwise select one of the mode inputs which results in screenshot 1000 being presented on display 234 for the selected mode input. In the example illustrated, user has selected the mode input "correct result" as a mode input for which a mode input action is to be assigned.

As further shown by FIG. 12, user settings module 264 directs processor 236 to further display or presents various mode input action parameters that may be established or set by the user for the selected mode input. In the example illustrated, user may input or set characteristics such as the spin, impact/tap, orientation or sensing pattern parameters to be associated with a request for the selected mode input. For example, a user may create a setting which requires the sporting equipment 112 to be spun for a particular time, a particular number of revolutions, at a particular frequency and/or in a particular direction for the mode input action to be interpreted as a request for a mode input correcting a prior result determined by results module 50. A user may additionally or alternatively require that the equipment 112 be tapped or impacted at a particular location, with a particular force or for a predefined number of times the for the mode input action to be interpreted as a request for a mode input correcting a prior result determined by results module 50. A user may additionally or alternatively require that the equipment 112 be maintained predefined orientation (up/down/sideways), for predefined period of time and/or the predefined position of a marker on equipment for the mode input action to be interpreted as a request for a mode input correcting a prior result determined by results module 50. The "marker" comprises an indicator on the surface of equipment 112 that is to be held at a certain position for a predefined period of time for the mode input action to be interpreted as a request for a mode input correcting a prior result determined by results module 50. A user may additionally or alternatively require that a sensing surface on equipment 112 (if provided) be interacted upon by a person in a certain manner, such as a person moving his or her finger fingers across the sensing surface in a predefined pattern (or gesture), for a particular period of time or with a particular number of such interactions for the mode input action to be interpreted as a request for a mode input correcting a prior result determined by results module 50. For example, in one implementation, equipment 112 may include a small touchpad and inconspicuous location on the equipment 112, wherein a person may slide his or her fingers across the sensing surface for entering a mode input action to change and operational state of results module.

As noted at the bottom of screenshot 1000, user settings module 264 allows a person to establish one or multiple parameter requirements for each of the mode inputs. Once settings have been entered, the person may indicate completion and save the settings. In addition to replacing mode input actions for a particular mode input, user settings module 264 further allows a person to add or create mode input actions for various inputs to application or. In other implementations, user settings module 264 is omitted, wherein the mode inputs and their designated mode input actions are predefined and stored.

Figure 13:
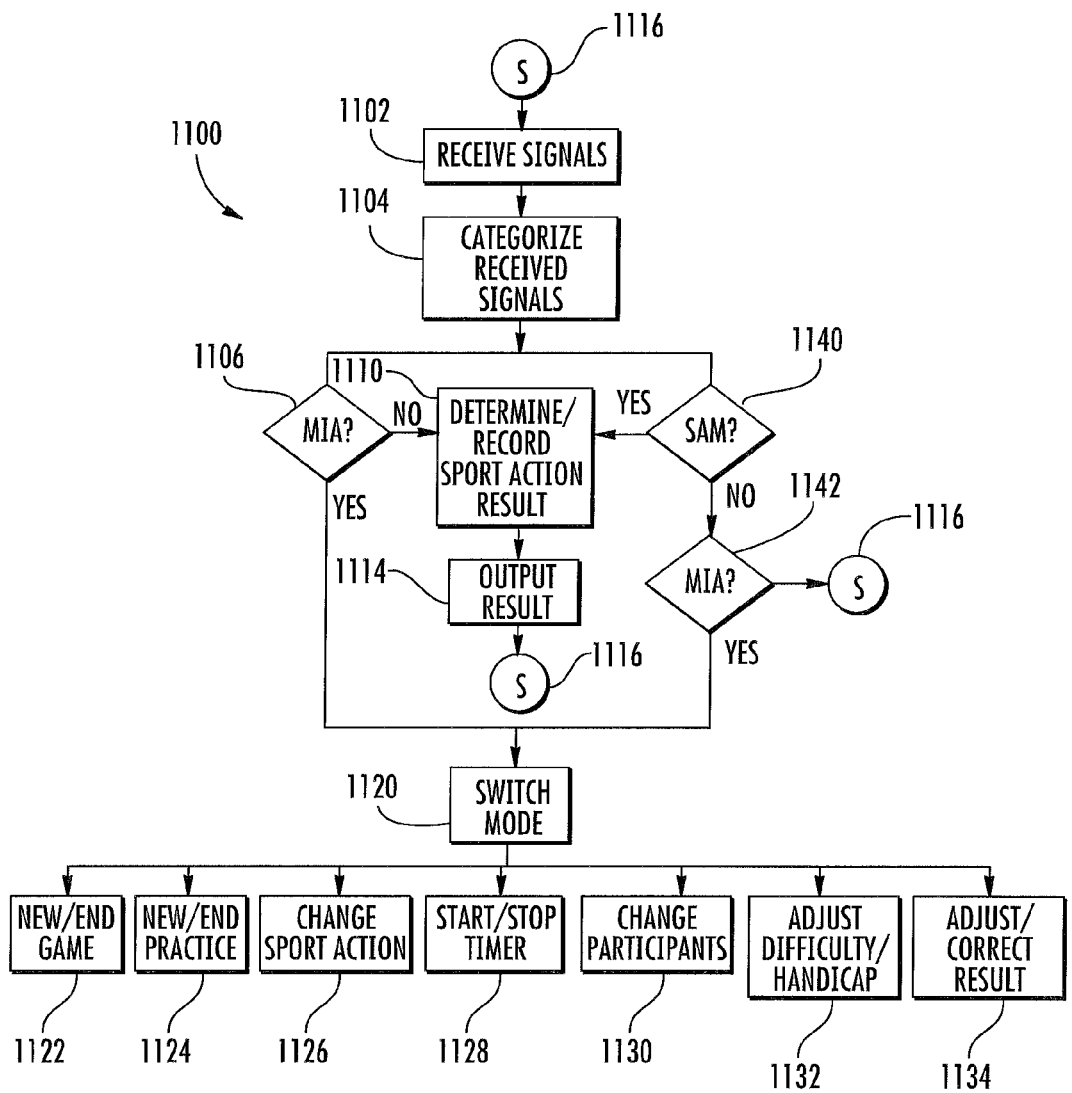
FIG. 13 is a flow diagram of an example method that may be carried out by the system of FIG. 4.

FIG. 13 is a flow diagram of an example method 1100 that may be carried out by system 210 or another system. Similar to method 100, method 1100 signals received from a piece of sporting equipment to determine whether such signals represent a sport action which is to be recorded and/or analyzed or whether such signals represent a mode input action serving as a mode input to change and operational state or mode of a program or computer application carried out using the signals from sensor 40. As indicated by block 1102, decision module 46 receives signals from sensor 40 via transmitters 152 and 232. As indicated by block 1104, decision module 46 directs processor 236 to categorize the received signals. In particular, processor 236 determines whether the signals represent a sport action which is to be recorded and/or analyzed whether such signals represent a mode input action serving as a mode input change and operational state or mode of results module 50.

In the example illustrated in FIG. 13, system 210 is operable in two alternative, user selectable modes. The two different categorization modes are represented different branches extending from block 1104. As indicated by decision block 1106, when operating in a first categorization mode, decision module 46 determines whether the signals from sensor 40 correspond to a predefined mode input action stored in library 260. As noted above, in one implementation or selectable mode, decision model 46 compares the pattern of the signals received from sensor 40 to the pattern entries in library 260 to determine whether such patterns match any of the pattern entries in library 260 that are assigned to mode inputs. In another implementation or selectable mode, decision module 46 identifies the particular equipment state, such as the position, orientation, movement, sensing surface interaction or impact values from the pattern of signals and then compares the identified equipment state to the equipment state entries in library 260 to determine if the determined equipment state sufficiently matches an equipment state entry that is assigned to a particular mode input.

As indicated by block 1110, in response to determining that the signals from sensor 40 do not correspond with an entry in library 260 (a mode input action has not been detected), decision module 46 includes that the signals from sensor 40 are sport action signals and not mode input signals. As a result, result module 50 maintains its current operational state and carries out the determination and recording of results. FIG. 14 illustrates an example screenshot 1200 presented on display 234 by results module 50 as signals from sensor 40 representing sport actions are being received and analyzed. The example shown in FIG. 14 pertains to a practice session involving shots of a basketball, wherein results module 50 records parameter results such as spin, height and distance of a shot determined based upon signals from sensor 40 and further results a target result (whether the shot was a made attempt or a missed attempt).

In the example illustrated, results module 50 further calculates an ongoing statistical result for various sport actions such as field-goal percentage, free-throw percentage, three point percentage and two point percentage. In the example illustrated, results module 50 further graphically present such information in the form of a bar graph illustrating such percentages. In addition to being displayed, such results are stored in a persistent storage device or memory. In other implementations, results module 50 may determine a record other sport action results for a basketball or other sport action results for other types of sport equipment.

As indicated by block 1114, results module 50 further outputs the most recent result to equipment 112. In the example illustrated, results module 50 directs processor 236 to transmit a signal to processor 254 on equipment 112 (via transmitters 232 and 152), wherein processor 254 indicates the most recent result on result indicator 252. In one implementation in which result indicator 252 comprises a light emitting diode, the light emitting diode may emit a first color of light in response to a determination by results module 50 that the most recent shot attempt was a made basket and may emit a second different color of light in response to a determination by results module 50 that the most recent shot attempt was a missed basket. As a result, the user may immediately determine, without necessarily viewing electronic device 222, whether results module 50 accurately identified the target result of the sports action, allowing the user to change or correct the recorded result if necessary. As indicated by flow marker 1116, after output of the result, processor 236 continues to look for and receive signals from sensor.

As indicated by block 1120, in response to decision module 46 determining that the signals received from sensor 40 either have a pattern that matches a pattern entry in library 260 or that are determined to result from a mode input action that matches a mode input action entry in library 260, mode adjustment module 48 directs processor 236 to change or switch an operational mode of results module 50. In the example illustrated, depending upon which signal pattern entry or equipment state entry of library 260 corresponds to the signals received from sensor 40, mode adjustment module 48 carries out one of various operational mode changes.

As indicated by block 1122, in response to a determination by decision module 46 that the mode input action corresponds to a first entry in library 260, mode adjustment module 48 changes the operational mode of results module 50 by ending the current game or initiating a new game depending upon the current state. For example, if results module 50 is presently in a game, the mode input action results in mode adjustment module 48 terminating the game. If results module 50 is not presently in a game, the mode input action results in module 48 initiating a new game.

As indicated by block 1124, in response to a determination by decision module 46 that the mode input action corresponds to a second entry in library 260, mode adjustment module 48 changes the operational mode of results module 50 by ending the current practice session or initiating a new practice session depending upon the current state.

As indicated by block 1128, in response to a determination by decision module 46 that the mode input action corresponds to a third entry in library 260, mode adjustment module 48 changes the operational mode of results module 50 by changing the sport action being monitored. For example, results module 50 may be monitoring the results from a practice session involving the punting of a football. In one implementation, the mode input corresponding to the third entry in library 260 is a binary or toggle type of switch, causing results module 52 alternate between two different sport action monitoring selections.

In another implementation, the mode input corresponding to the third entry in library 260 merely indicates that the sport action currently being monitored is to be switched, wherein the particular sport action to be monitored is selected through a subsequent mode input action. In one implementation, in response to a mode input action matching a particular mode input action entry in library 260, mode adjustment module 48 automatically accesses a secondary mode input library or table having mode input action entries which correspond to different available selections. For example, spinning the football a predetermined number of times may be read by mode adjustment module as indicating that the sport action being monitored is to be changed. As a result, mode adjustment module 48 accesses a secondary mode input library having mode input action entries corresponding to different available selections for the sport action to be monitored. Thereafter, immediate subsequently received mode input actions are compared to the entries in the secondary mode input library to identify what particular selection is being made. For example, following the spinning of the football the predetermined number of times to indicate that sport action being monitored is to be changed, mode adjustment module 48 monitors and awaits a follow-up mode input action indicating the user's selection. For example, a user selection may be indicated by tapping of the football following the earlier spinning of the football. Tapping the football a first number of times results in mode adjustment module 48 switching results module 52 monitoring kickoffs of the football, tapping the football a second different number of times result in mode adjustment module 48 switching results module 50 to monitoring field-goal attempts and tapping the football a third different number of times results in mode adjustment module 48 switching results module 50 to monitoring throws of the football. Similar conventions are applicable to other mode adjustments.

As indicated by block 1128, in response to a determination by decision module 46 that the mode input action corresponds to a fourth entry in library 260, mode adjustment module 48 changes the operational mode of results module 50 by starting a clock or stopping a clock depending upon the current state.

As indicated by block 1130, in response to a determination by decision module 46 that the mode input action corresponds to a fifth entry in library 260, mode adjustment module 48 changes the operational mode of results module 50 by changing the current list or number of participants in an ongoing virtual or multiplayer game or the number of participants in a practice session. As noted above, in one implementation, the mode input action corresponding to the fifth entry in library 260 may merely indicate that a change is to be made, wherein immediately subsequent mode input actions are compared to a secondary table or mode input library to identify the particular selection or the particular participant to be added or removed.

As indicated by block 1132, in response to a determination by decision module 46 that the mode input action corresponds to a sixth entry in library 260, mode adjustment module 48 changes the operational mode of results module 50 by changing the current handicap or difficulty level being applied by results module 50 in an ongoing virtual or multiplayer game or in a practice session. As noted above, in one implementation, the mode input action corresponding to the sixth entry in library 260 may merely indicate that a change is to be made, wherein immediately subsequent mode input actions are compared to a secondary table or mode input library to identify the particular selection or the particular handicap/difficulty level to be used.

As indicated by block 1134, in response to a determination by decision module 46 that the mode input action corresponds to a seventh entry in library 260, mode adjustment module 48 causes results module 50 to correct or change the most recent result that was incorrectly determined by results module 50. In one implementation, the result may be binary, such as whether a shot attempt was made or missed, wherein receipt of the mode input action corresponding to the seventh entry in library 260 toggles the prior result, such as from a made shot to a missed shot or from a missed shot to a made shot.

In other implementations, the recorded results may not be binary. In such an implementation, the mode input action corresponding to the sixth entry in library 260 may merely indicate that a change is to be made, wherein immediately subsequent mode input actions are compared to a secondary table or mode input library to identify the particular correction to be applied. For example, results module 50, using signals from sensor 40, may have incorrectly determined that a prior shot was a free throw attempt. Upon receipt of a mode input action corresponding to the sixth entry in library 260, mode adjustment module 48 compares a subsequently received mode input action to a secondary mode input library of shot identification corrections, allowing the user to identify how the incorrect identification of the prior shot should be corrected. For example, by manipulating sport equipment 112 with different predetermined mode input actions having entries in the secondary mode input action library, the user may indicate whether the prior shot should have been correctly identified as either a three point attempt, a two-point attempt or the like.

As indicated by decision blocks 1140 and 1142, system 210 is operable in a second categorization mode. As indicated by block 1140, decision module 46 first compares the pattern of signals received from sensor 40 to the sport action motions of library 262. If the pattern of signals or the equipment state determined from the pattern of signals sufficiently matches an entry in the sport action library 262, such signals are determined to be the result of a sports action motion, causing results module 50 to carry out the steps identified in blocks 1110 and 1114. Alternatively, as indicated by block 1142, if the pattern of signals or the equipment state determined from the pattern of signals does not sufficiently match an entry in the sport action library 262, decision module 46 compares the pattern of signals or the determined equipment state to the entries in mode input library 260. If the pattern of signals or the equivalent state determined from the pattern of signals sufficiently matches an entry in the mode input library 260, mode adjustment module 48 carries out switching of the operational mode of results module 50 per block 1120. Alternatively, if the pattern of signals or the equivalent state determined from the pattern of signals does not sufficiently match an entry in the mode input library 260, mode adjustment module 48 continues to receive and monitor signals in block 1102.

While the preferred embodiments of the invention have been illustrated and described, it will be appreciated that various changes can be made therein without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. An apparatus comprising:
   a sensor to be carried by a piece of sporting equipment, the sensor to sense at least one of an orientation of the piece of sporting equipment, non-zero movement of the piece of sporting equipment and an impact experienced by the piece of sporting equipment; and
   a non-transitory computer-readable medium containing program logic that operates different operational modes, the program logic to:
      receive signals from the sensor;
      determine from the signals whether the piece of sporting equipment is in a sport action state or a mode input state, wherein the program logic is to distinguish between at least one of: (1) a first sensed orientation of the piece of sporting equipment corresponding to the sport action state and a second sensed orientation of the piece of sporting equipment, different than the first sensed orientation and corresponding to the mode input state; (2) a first sensed non-zero movement of the piece of sporting equipment corresponding to the sport action state and a second nonzero movement of the piece of sporting equipment, different than the first sensed nonzero movement and corresponding to the mode input state; and (3) a first sensed impact of the piece of sporting equipment corresponding to the sport action state and a second sensed impact of the piece of sporting equipment, different than the first sensed impact, corresponding to the mode input state;
      record a sport action result in response to determination that the piece of sporting equipment is in a sport action state; and
      switch the program logic to a different operational mode in response to determination that the piece of sporting equipment is in a mode input state.

2. The apparatus of claim 1, wherein the program logic is to determine, from the signals, whether the piece of sporting equipment is undergoing a sport action motion, the sport action motion comprising motion of the piece of sporting equipment that occurs during a sporting competition, wherein the programmed logic determines that sporting equipment is in a sport action state in response to determining that the piece of sporting equipment is undergoing the sport action motion.

3. The apparatus of claim 2, wherein sport action motion is selected from a group of sport action motions consisting of: a swing of a regulation tennis racquet; a swing of a regulation bat, a swing of a regulation golf club; a shot of a regulation basketball; a punt of a regulation football; a kick of a regulation football; a throw of a regulation football; a pitch of regulation baseball; a pitch of a regulation softball;

a catch of a ball with a regulation ball glove; an impact of a regulation volleyball; and a kick of a regulation soccer ball.

4. The apparatus of claim 1, wherein the mode input state is identified by the programmed logic based upon a determination by the programmed logic from the signals that the piece of sporting equipment is in a predefined orientation for a predefined period of time, the predefined orientation being an orientation of the piece supporting equipment that does not occur naturally for the predefined period of time during a competition using the piece of sporting equipment.

5. The apparatus of claim 1, wherein the program logic is to determine that the piece of sporting equipment is in the mode input state based upon a determination, by the program logic from the signals from the sensor, that the piece of sporting equipment is specifically undergoing or has specifically undergone at least one rotation of at least 90 degrees about an axis in a first rotational direction of the piece of sporting equipment; at least one rotation of at least 90 degrees about an axis in a second rotational direction of the piece of sporting equipment; at least one tap of the piece of sporting equipment in at least one predetermined location; at least one impact of the piece of sporting equipment in a predetermined location; or combinations thereof.

6. The apparatus of claim 1, wherein the mode input state is identified by the program logic based upon a determination by the program logic, from the signals, that the piece of sporting equipment is undergoing or has undergone a predefined mode input action, the predefined mode input action comprising motion of the piece of sporting equipment that does not occur naturally during a competition using the piece of sporting equipment.

7. The apparatus of claim 6, wherein the predefined mode input action comprises a predefined spin of the piece of sporting equipment while the piece of sporting equipment is a stationary, non-translational position.

8. The apparatus of claim 7, wherein the predefined mode input action comprises the predefined spin of the piece of sporting equipment that satisfies a predefined period of time, a predefined number revolutions or a predefined rotational frequency.

9. The apparatus of claim 8, wherein the predefined period of time, the predefined number of revolutions and the predefined rotational frequency each comprise a predefined minimum, a predefined maximum or a predefined range.

10. The apparatus of claim 6, wherein the predefined mode input action comprises at least one predefined mode input action selected from a group of predefined mode input actions consisting of: a predefined spin of a stationary regulation basketball; a predefined spin of a stationary regulation football; a predefined spin of a stationary soccer ball; a predefined spin of a stationary regulation tennis racquet; a predefined spin of a stationary regulation golf club; define spin of a stationary regulation bat; a predefined spin of a stationary regulation baseball; a predefined spin of a stationary regulation softball; and a predefined spin of a regulation stationary soccer ball.

11. The apparatus of claim 1, wherein the mode input state is identified by the program logic based upon the signals indicating that the piece of sporting equipment is being impacted in a predefined impact manner, the predefined impact manner being an impact of the piece supporting equipment that does not occur naturally during a competition using the piece of sporting equipment.

12. The apparatus of claim 11, wherein the predefined impact manner comprises a predefined impact against a predefined portion of the piece of sporting equipment.

13. The apparatus of claim 12, wherein the predefined portion of the piece of sporting equipment that is impacted for the predefined mode input state is selected from a group of predefined portions of the piece of sporting equipment consisting of: a butt cap of a tennis racquet; a handle butt of a golf club; a knob of a bat; an end cap of a bat; a predefined portion of a ball having a marking indicating the predefined portion of the ball; laces of a football; a nose of a football; threads of a baseball; and threads of a softball.

14. The apparatus of claim 1, wherein the program logic is to generate and store a statistic based upon the sport action result recorded in response to determination that the piece of sporting equipment was in the sport action state.

15. The apparatus of claim 1, wherein the mode input state is identified by the program logic based upon a determination by the program logic, based upon the signals, that the piece of sporting equipment is undergoing or has undergone a predefined motion of the piece of sporting equipment that does not occur naturally during a competition using the piece of sporting equipment and wherein the different operational mode to which the program logic is switched in response to determination that the piece of sporting equipment is in the mode input state is selected from a group of operational modes consisting of: starting a new game during which the sporting equipment is in the sport action state; starting a new practice session during which the sporting equipment is in the sport action state; altering a previously recorded sport action result; altering a score or a game statistic in a game during which the sporting equipment is in the sport action state; ending a game during which the sporting equipment is in the sport action state; ending a practice session during which the sporting equipment is in the sport action state; initiating transmission of a recorded sport action result to a remote recipient; changing/adding/removing participants in a game during with the sporting equipment is in the sport action state; changing the type of game to be initiated; adjusting the point total to be associated with a particular sport action; and applying/adjusting a handicap in a game during which the sporting equipment is in the sport action state.

16. The apparatus of claim 1, wherein the program logic is to determine the sport action result from the received signals and wherein the different operational mode to which the program logic is switched in response to determination that the piece of sporting equipment is in the mode input state comprises correcting an incorrect sport action result determined from the received signals.

17. The apparatus of claim 1, wherein the piece of sporting equipment comprises a regulation basketball, wherein the program logic is to determine whether the basketball is in the sport action state during which the basketball is part of a shot attempt based upon the signals from the sensor and wherein the program logic is to determine the sport action result comprising whether the shot attempt is a made basket based at least in part upon the signals from the sensor.

18. The apparatus of claim 1, wherein the piece of sporting equipment comprises a soccer ball, wherein the program logic is to determine whether the soccer ball is in the sport action state during which the soccer ball is in play as part of a soccer game based upon the signals from the sensor and wherein the program logic is to determine the sport action result comprising whether movement of the soccer ball has resulted in a goal based at least in part upon the signals from the sensor.

19. The apparatus of claim 1 further comprising a wireless transmitter to be carried by the piece of sporting equipment, the wireless transmitter to transmit the signals from the piece of sporting equipment to a remote computing device including the program logic.

20. The apparatus of claim 1, wherein the mode input state is identified by the program logic based upon the signals indicating that the piece of sporting equipment is undergoing or has undergone a predefined combination of different mode input actions, the combination of predefined mode input actions comprising a combination of different motions of the piece supporting equipment that does not occur naturally during a competition using the piece of sporting equipment.

21. The apparatus of claim 20, wherein the combination of different mode input actions comprises a first mode input action followed by a second mode input action within a predetermined time following the first mode input action.

22. The apparatus of claim 21, where one of the first mode input action and the second mode input action comprises a predetermined spin about a predetermined spin axis and wherein the other of the first mode input action and the second mode input action comprises a predetermined impact at a predetermined location on the piece of sporting equipment.

23. The apparatus of claim 1 the signals from which a determination is made as to whether the piece of sporting equipment is in the sport action state or the mode input state are received immediately following the receipt of signals indicating the piece of sporting equipment to be in the sport action state.

24. The apparatus of claim 1, wherein the program logic is to further identify one of a plurality of different available operational modes for the program logic based upon signals from the sensor following the determination that the piece of sporting equipment is in a mode input state.

25. The apparatus of claim 1 further comprising a mode input library comprising different input action entries and corresponding different mode input selections.

26. A method comprising:
receiving signals from a sensor carried by a piece of sporting equipment;
determining from the signals, using program logic, whether the piece of sporting equipment is in a sport action state or a mode input state, wherein to determine whether the piece of sporting equipment is in the sport action state or the mode input state, the program logic distinguishes between at least one of: (1) a first sensed orientation of the piece of sporting equipment corresponding to the sport action state and a second sensed orientation of the piece of sporting equipment, different than the first sensed orientation and corresponding to the mode input state; (2) a first sensed non-zero movement of the piece of sporting equipment corresponding to the sport action state and a second nonzero movement of the piece of sporting equipment, different than the first sensed nonzero movement and corresponding to the mode input state; and (3) a first sensed impact of the piece of sporting equipment corresponding to the sport action state and a second sensed impact of the piece of sporting equipment, different than the first sensed impact, corresponding to the mode input state;
recording, using the program logic, a sport action result in response to a determination, by the program logic, that that the piece of sporting equipment is in a sport action state; and
switching the program logic to a different operational mode in response to determination that the piece of sporting equipment is in a mode input state.

\* \* \* \* \*